(12) United States Patent
Das et al.

(10) Patent No.: US 10,360,225 B1
(45) Date of Patent: Jul. 23, 2019

(54) QUERY SUGGESTIONS BASED ON ENTITY COLLECTIONS OF ONE OR MORE PAST QUERIES

(71) Applicant: Google Inc., Mountain View, CA (US)

(72) Inventors: Anwis Das, San Francisco, CA (US); Abhinandan Sujit Das, Cupertino, CA (US); Nitin Gupta, Santa Clara, CA (US); Renshen Wang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 6 days.

(21) Appl. No.: 15/155,421

(22) Filed: May 16, 2016

Related U.S. Application Data

(63) Continuation of application No. 14/038,392, filed on Sep. 26, 2013, now Pat. No. 9,342,626.

(60) Provisional application No. 61/838,269, filed on Jun. 22, 2013.

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC ........... G06F 17/3053; G06F 16/24578; G06F 16/9535
USPC ...................................................... 707/723
See application file for complete search history.

(56) References Cited

U.S. PATENT DOCUMENTS

| | | | |
|---|---|---|---|
| 7,870,147 B2 | 1/2011 | Bailey et al. | |
| 7,984,004 B2 | 7/2011 | Andrew et al. | |
| 8,301,639 B1 | 10/2012 | Myllymaki et al. | |
| 8,583,675 B1 | 11/2013 | Haahr et al. | |
| 2005/0234972 A1 | 10/2005 | Zeng et al. | |
| 2006/0224554 A1 | 10/2006 | Bailey et al. | |
| 2009/0171929 A1 | 7/2009 | Jing et al. | |
| 2009/0187515 A1* | 7/2009 | Andrew | G06F 17/3064 706/12 |
| 2010/0211588 A1 | 8/2010 | Jiang et al. | |
| 2010/0228710 A1* | 9/2010 | Imig | G06F 17/30867 707/706 |
| 2011/0055189 A1 | 3/2011 | Effrat et al. | |
| 2011/0072033 A1* | 3/2011 | White | G06F 17/3064 707/768 |
| 2011/0191364 A1 | 8/2011 | LeBeau et al. | |

(Continued)

*Primary Examiner* — Jensen Hu
(74) *Attorney, Agent, or Firm* — Middleton Reutlinger

(57) ABSTRACT

Methods and apparatus for providing query suggestions to a user based on one or more past queries submitted by the user. Candidate query suggestions responsive to a current query may be identified. A candidate query similarity measure may be determined for a given candidate query suggestion based on matching entities related to the given candidate query suggestion and the one or more past queries. In some implementations, the similarity measure of the given candidate query suggestion may be based on a comparison of current entities of the given candidate query suggestion that match entities of one or more past queries, to a group of the current entities that includes entities that do not match the entities of one or more past queries. In some implementations a ranking of the candidate query suggestions may be determined based on the similarity measure.

15 Claims, 9 Drawing Sheets

(56) References Cited

U.S. PATENT DOCUMENTS

| | | | |
|---|---|---|---|
| 2011/0314021 A1* | 12/2011 | Gibbs | G06F 17/3064 707/737 |
| 2012/0036123 A1* | 2/2012 | Hasan | G06F 17/30386 707/723 |
| 2014/0156693 A1 | 6/2014 | Kritt et al. | |
| 2014/0214822 A1 | 7/2014 | Sinha et al. | |

* cited by examiner

220A — an | Search
anthropologie
ann taylor
animal jam
anthem
— 230A

FIG. 3A

220B — an | Search
andromeda
antigone
antaues
andromeda galaxy
— 230B

FIG. 3B

220C — an | Search
andromeda
anthropologie
ann taylor
animal jam
— 230C

FIG. 3C

220D — an | Search
andromeda galaxy
anthropologie
ann taylor
animal jam
— 230D

FIG. 3D

| Entity | Popularity Measure for Entity (f) | $PQ_1$ | $PQ_2$ | $PQ_3$ | Cumulative Entity Scores based on | | Adjusted Cumulative Entity Score | | A |
|---|---|---|---|---|---|---|---|---|---|
| | | | | | Average $(PQ_1 + PQ_2 + PQ_3)/3$ $= ES_1$ | Weighted Sum based on Time $(w_1 = .6, w_2 = .8, w_3 = 1)$ $(PQ_1*w_1 + PQ_2*w_2 + PQ_3*w_3)/3$ $= ES_2$ | $ES_1*(1/f)$ Normalized | $ES_2*(1/f)$ Normalized | B |
| $E_1$ | 0.200 | 0.7 | 0.6 | 0.6 | 0.630 | 0.500 | 0.367 | 0.36 | C |
| $E_2$ | 0.250 | 0.0 | 0.3 | 0.3 | 0.200 | 0.180 | 0.093 | 0.10 | D |
| $E_3$ | 0.100 | 0.2 | 0.2 | 0.2 | 0.200 | 0.160 | 0.233 | 0.23 | E |
| $E_4$ | 0.025 | 0.1 | 0.0 | 0.1 | 0.066 | 0.053 | 0.307 | 0.31 | F |
| 1 | 2 | 3 | 4 | 5 | 6 | 7 | 8 | 9 | |

FIG. 4A

| Candidate Query Suggestion | Ranking Score (R) | $E_1$ | $E_2$ | $E_3$ | $E_4$ | Candidate Query Similarity Measure | | Adjusted Ranking Score | | | A |
|---|---|---|---|---|---|---|---|---|---|---|---|
| | | | | | | Sum of Scores $ES_1$ of Matching Entities = $S_1$ | Sum of Scores $ES_1*(1/f)$ of Matching Entities = $S_2$ | $(R + S_1)$ | Boosted Score $S^*_2 = 1/(1 - \sqrt{S_2})$ | $(R + S^*_2)$ | B |
| $CQ_1$ | 15.00 | 0 | 0 | 0 | 1 | 0.066 | 0.307 | 15.066 | 2.24 | 17.24 | C |
| $CQ_2$ | 14.75 | 1 | 0 | 0 | 1 | 0.696 | 0.674 | 15.446 | 5.58 | 20.33 | D |
| ..... | ..... | 0 | 0 | 0 | 0 | 0.000 | 0.000 | ..... | ..... | ..... | E |
| $CQ_{49}$ | 2.00 | 1 | 1 | 0 | 1 | 0.830 | 0.764 | 2.830 | 8.05 | 10.05 | F |
| $CQ_{50}$ | 1.50 | 1 | 0 | 1 | 1 | 0.896 | 0.907 | 2.396 | 20.99 | 22.49 | G |
| 1 | 2 | 3 | 4 | 5 | 6 | 7 | 8 | 9 | 10 | 11 | |

FIG. 4B

**Entity Collections and Scores
for Past Query "perseus"**

| Entity Collection | Entity Score |
|---|---|
| Figures | 0.4212 |
| Art Subjects | 0.5588 |
| Film Characters | 1.1121 |
| Names | 0.5421 |
| Constellations | 0.5411 |
| Fictional Characters | 0.8954 |
| Heroes | 0.1691 |
| Mortals | 0.4327 |
| Persons | 0.3921 |
| Opera Characters | 1.521 |

FIG. 5A

**Entity Collections and Scores
for Candidate Query "andromeda"**

| Entity Collection | Entity Score |
|---|---|
| Figures | 0.3320 |
| Art Subjects | 0.2282 |
| Film Characters | 1.3860 |
| Names | 0.3956 |
| Constellations | 0.4780 |
| Fictional Characters | 0.9992 |
| Creatures | 0.3932 |
| Princesses | 0.3321 |

FIG. 5B

**Entity Collections and Scores
for Candidate Query "ann taylor"**

| Entity Collection | Entity Score |
|---|---|
| Names | 0.7831 |
| Businesses | 0.7873 |
| Retail Stores | 1.1230 |
| Clothing Stores | 1.2956 |

QUERY SUGGESTIONS BASED ON ENTITY COLLECTIONS OF ONE OR MORE PAST QUERIES

BACKGROUND

A user may submit a query to a search engine to locate information related to the query. When entering a query, a user may desire to have one or more suggestions provided that are based on the entered query. For example, a user may enter a partial query and desire query suggestions to be provided that are based on the partial query.

SUMMARY

This specification is directed generally to providing query suggestions to a user, and more particularly, to providing query suggestions to a user based on one or more past queries submitted by the user. Candidate query suggestions responsive to a current query may be identified. A similarity measure may be determined for a given candidate query suggestion based on one or more entities that are related to the given candidate query suggestion and that are also related to the one or more past queries. In some implementations the similarity measure may be further based on one or more entities that are related to the given candidate query suggestion and that are not related to the one or more past queries. In some implementations, the one or more entities on which the similarity measure is based may include, or be restricted to, entity collections.

In some implementations, the similarity measure may be based on cumulative entity collection scores, for the given candidate query suggestion, of the entity collections that are related to the given candidate query suggestion and that are also related to the one or more past queries. In some implementations, the similarity measure may additionally and/or alternatively be based on cumulative entity collection scores of the entity collections that are related to the given candidate query suggestion but not related to the one or more past queries. In some implementations, the similarity measure may additionally and/or alternatively be based on the entities that are related to the one or more past queries but not related to the given candidate query suggestion.

In some implementations a ranking of the given candidate query suggestion may be adjusted based on the similarity measure. A given candidate query suggestion may be selected as a query suggestion based on the adjusted ranking and/or the similarity measure.

For example, a user may have issued a past query of "perseus". The user may be interested in learning more about Greek mythology and may start typing a current query such as "an" after issuing the past query of "persues". "andromeda" may not by default be provided as a query suggestion in response to the partial query "an" due to, for example, a low ranking associated with the query suggestion "andromeda" based on traditional or other query suggestion ranking techniques. Based on techniques described herein, one or more entity collections associated with the query suggestion "andromeda" may be identified as past entity collections that are also associated with the past query "perseus" such as, for example, the entity collections of "art subjects", "fictional characters", "film characters", "constellations", etc. Based on identification of the entity collections that are associated with the query suggestion "andromeda" and that are also associated with the past query "perseus", the query suggestion "andromeda" may be promoted as a query suggestion for the partial query "an". For example, the ranking associated with the query suggestion "andromeda" may be promoted so that "andromeda" is more likely to be provided as a query suggestion.

In some implementations a computer implemented method may be provided that includes the steps of: identifying a current query; identifying one or more past queries, the past queries issued prior to the current query; identifying one or more past entity collections related to one or more of the identified past queries; identifying one or more candidate query suggestions for the current query; identifying, for a given candidate query suggestion of the candidate query suggestions, one or more current entity collections related to the given candidate query suggestion; determining, for the given candidate query suggestion, the current entity collections that match the past entity collections; and ranking the given candidate query suggestion based on a comparison of the current entity collections that match the past entity collections to the current entity collections of a group of the current entity collections, the group including one or more of the current entity collections that do not match the past entity collections.

This method and other implementations of technology disclosed herein may each optionally include one or more of the following features.

The method may further include determining, based on the ranking, whether to provide the given candidate query suggestion as a query suggestion for the current query.

The group may include all identified of the current entity collections.

The comparison of the current entity collections that match the past entity collections to the current entity collections of the group may include comparing the quantity of the current entity collections that match the past entity collections to the quantity of the current entity collections of the group. The group may include all identified of the current entity collections, and comparing the quantity of the current entity collections that match the past entity collections to the quantity of the current entity collections of the group may include: dividing the quantity of the current entity collections that match the past entity collections by the quantity of the current entity collections of the group.

The method may further include: identifying rankings of each of the current entity collections for the given candidate query suggestion; wherein the comparison of the current entity collections that match the past entity collections to the current entity collections of the group includes: comparing the rankings of the current entity collections that match the past entity collections to the rankings of the current entity collections of the group. Comparing the rankings of the current entity collections that match the past entity collections to the rankings of the current entity collections of the group may include: comparing the sum of the rankings of the current entity collections that match the past entity collections to the sum of the rankings of the entity collections of the group.

Ranking the given candidate query suggestion may be further based on a comparison of the past entity collections that match the current entity collections to the past entity collections of a past entity group of the past entity collections, the past entity group including one or more of the past entity collections that do not match the current entity collections. The comparison of the past entity collections that match the current entity collections to the past entity collections of the past entity group may include: identifying rankings of the past entity collections for the one or more past entities; comparing the rankings of the past entity collections that match the current entity collections to the rankings of the past entity collections of the past entity group.

The comparison of the current entity collections that match the past entity collections to the current entity collections of the group may include: weighting each of the current entity collections based on an overall popularity measure indicative of overall popularity of the entity collection; wherein as the popularity measure of the entity collection becomes less indicative of popularity, the weighting of the entity collection increases.

Identifying the one or more current entity collections may include determining, for each of the current entity collections, that a ranking of the entity collection for the current query satisfies a threshold.

Identifying the one or more current entity collections may include determining, for each of the past entity collections, that a ranking of the past entity collection for at least one of the past queries satisfies a threshold.

The one or more past queries may include a plurality of past queries. The method may further include: determining whether the past queries are part of an on-topic query session, wherein ranking the given candidate query suggestion based on the comparison of the current entity collections that match the past entity collections to the current entity collections of the group only occurs if the past queries are determined to be part of an on-topic query session. Determining the past queries are part of an on-topic query session may include: identifying, for each of the past queries, one or more entity collections related to the past query; determining a similarity measure among the past queries based on similarity between the identified entity collections of the past queries; and determining the past queries are part of an on-topic query session if the similarity measure satisfies a threshold.

The method may further include determining, for each of the past entity collections, a cumulative ranking of the past entity collection based on a ranking of the past entity collection for each of the past queries. The ranking of the given candidate query suggestion may further be based on the cumulative rankings of the past entity collections. Determining the cumulative ranking of the past entity collections based on the ranking of the past entity collections in each of the past queries may include weighting the ranking of the past entity collections for more recent of the past queries greater than the ranking of the past entity collections for less recent of the past queries.

The past entity collections and/or the current entity collections may be identified from a query to entity mapping.

The past queries may immediately precede the current query.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein provide query suggestions to a user based on entities related to one or more past queries by the user. Particular implementations of the subject matter described herein may determine an on-topic query session and optionally may select one or more query suggestions based on the on-topic query session. Particular implementations of the subject matter described herein may provide the selected query suggestions to the user.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A illustrates an example graphical user interface for displaying query suggestions in response to a partial query, wherein the query suggestions are selected without taking into account one or more previous queries.

FIG. 3B illustrates an example graphical user interface for displaying search results in response to a query, wherein the query suggestions are selected taking into account the past query of FIG. 2.

FIG. 3C illustrates another example graphical user interface for displaying search results in response to a query, wherein the query suggestions are selected taking into account the past query of FIG. 2.

FIG. 3D illustrates another example graphical user interface for displaying search results in response to a query, wherein the query suggestions are selected taking into account multiple past queries.

FIG. 4A is a table illustrating example methods of determining cumulative entity scores.

FIG. 4B is a table illustrating example methods of determining rankings for candidate query suggestions.

FIG. 5A is a table illustrating example entity collections related to the query "perseus" and illustrating scores associated with the entity collections for the query.

FIG. 5B is a table illustrating example entity collections related to the query "andromeda" and illustrating scores associated with the entity collections for the query.

FIG. 5C is a table illustrating example entity collections related to the query "ann taylor" and illustrating scores associated with the entity collections for the query.

DETAILED DESCRIPTION

Figure 1:
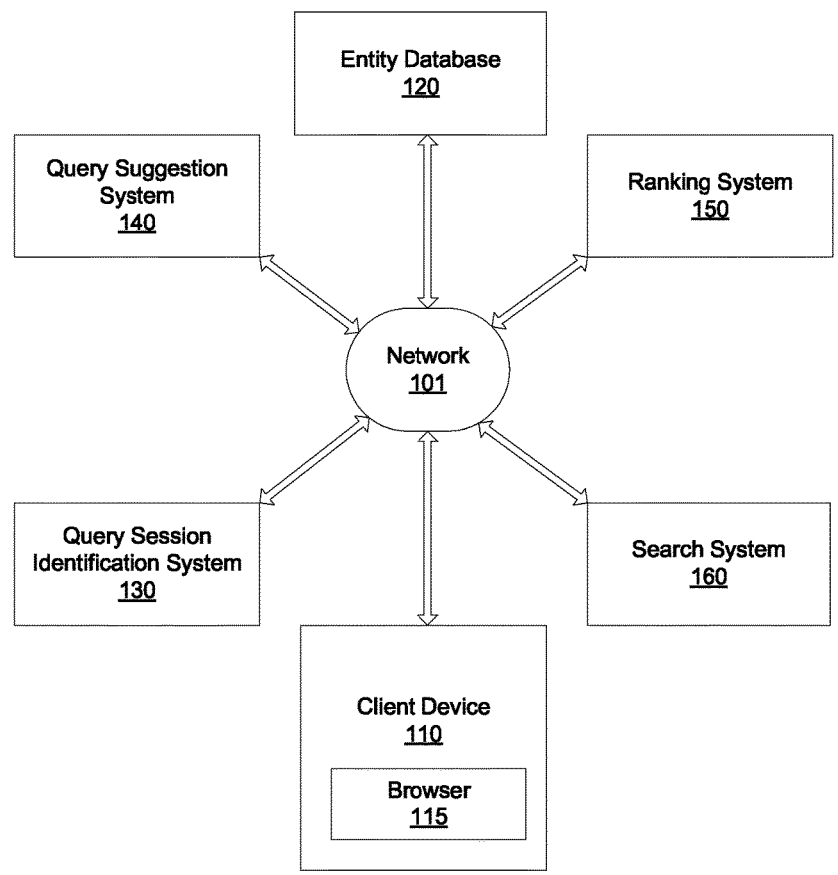
FIG. 1 illustrates a block diagram of an example environment in which one or more query suggestions are provided to a user in response to a current query.

FIG. 1 illustrates a block diagram of an example environment in which one or more query suggestions are provided to a user in response to a current query. The example environment of FIG. 1 may include a client device 110, an entity database 120, a query session identification system 130, a query suggestion system 140, a ranking system 150, and/or a search system 160. The environment may also include a communication network 101 that enables communication between various components of the environment. In some implementations the communication network 101 may include the Internet, one or more intranets, and/or one or more bus subsystems. The communication network 101 may optionally utilize one or more standard communications technologies, protocols, and/or inter-process communication techniques.

A user may interact with the search system 160 through a client device 110. The client device 110 may be, for example, a desktop computing device, a laptop computing device, a tablet computing device, a mobile phone, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device). Additional and/or alternative computing devices of the user may be provided. The client device 110 and the search system 160 each include memory for storage of data and software applications, a processor for accessing data and executing applications, and components that facilitate communication over a communication network 101. The operations performed by the client device 110 and/or the search system 160 may be distributed across multiple computer systems.

The client device 110 may execute one or more applications, such as web browsers (e.g., web browser 115), that enable the user to formulate queries and optionally submit completed queries to the search system 160. In some implementations queries may be submitted to the search system 160 from the client device 110. In some implementations queries may be submitted from the query session identification system 130 and/or other component to the search system 160.

The search system 160 is an example of an information retrieval system in which the systems, components, and techniques described herein may be implemented and/or with which the systems, components, and techniques described herein may interface. The search system 160 may receive queries from the client device 110 and/or other component and may return search results in response to the queries. For example, in response to a query from the client device 110, the search system 160 may provide a plurality of search results to be displayed in the web browser 115 that is executing on the client device 110. Each query may be a request for information. The query may be, for example, in a text form and/or in other forms such as, for example, audio form and/or image form. Other computing devices may submit search queries to the search system 160 such as a server implementing a service for a website that has partnered with the provider of the search system 160. For brevity, however, the examples are described in the context of the client device 110, the query session identification system 130, and/or the query suggestion system 140.

The query session identification system 130 and/or a database, such as the entity database 120, may access and/or store past queries submitted by the user. In this specification, the term "database" will be used broadly to refer to any collection of data. The data of a database does not need to be structured in any particular way, or structured at all, and it may be stored on storage devices in one or more locations. Thus, for example, the entity database 120 may include multiple collections of data, each of which may be organized and accessed differently.

A past query of a user is a query that was submitted by the user prior to a current query of the user. In some implementations the number of past queries of a user that are accessed and/or stored may be limited to a fixed number of past queries. For example, the query session identification system 130 may only access the past N queries of the user. For example, the user may sequentially submit the queries: "tourism in Africa", "weather in Africa", "rivers", "rivers in Africa", and "Zambezi river". The query session identification system 130 may only access the three most recent queries: "rivers", "rivers in Africa", and "Zambezi river". In some implementations the number of past queries accessed and/or stored may be limited to a certain passage of time. For example, the query session identification system 130 may only access the past queries of the user that were submitted within the last half hour. For example, the query session identification system 130 may access all the queries of the preceding example if they were all submitted within the last half hour. In some implementations the query session identification system 130 may store time stamp data associated with the past queries to, inter alio, facilitate determination of queries that were submitted within a certain time frame.

The query session identification system 130 may identify, for each past query, one or more past entities related to the past query. In some implementations, entities are persons, places, concepts, and/or things that may be referred to by a text fragment (e.g., a term or phrase) and are distinguishable from one another (e.g., based on context). For example, the past queries "perseus", "helena", and "andromeda" may relate to respective of the past entities related to the characters from Greek mythology known as "Perseus", "Helena", and "Andromeda". A text segment such as a word and/or a phrase may potentially refer to multiple entities. For example, the text "andromeda" may potentially refer to multiple entities such as the entities related to the Greek mythological character, the galaxy, the science fiction television series, the software, the progressive metal band, or the techno-thriller movie "Andromeda Strain".

In some implementations, the entities identified by the query session identification system 130 for each past query may include one or more entity collections. An entity collection is an identifier of a grouping of entities that share one or more aspects in common. For example, the entities related to the characters from Greek mythology known as "Perseus", "Helena", and "Andromeda" may each belong to the entity collections of "Greek mythological characters", "names", "fictional characters", and/or other entity collections. In some implementations, the entities identified by the query session identification system 130 for each past query may only include entity collections. In some implementations, the entities identified by the query session identification system 130 for each past query may include entity collections and may also include one or more entities that are not entity collections (although the entities themselves may belong to an entity collection).

In some implementations, the query session identification system 130 may identify one or more entity collections for a query by determining, for the query, one or more entities that are related to the query and determining the entity collections to which such one or more entities belong. For example, for the query of "perseus", the entity related to the character from Greek mythology may be determined and the entity collections to which that entity belongs may be determined. Also, for example, for the query of "perseus and andromeda", the entities related to the characters from Greek mythology may be determined and the entity collections to which those entities belong may be determined. In some implementations an entity may be related to a past query without an alias of the entity being present in the past query. For example, the entity associated with the Greek god "Zeus" is a past entity related to the past query "the husband of greek mythological character hera", but an alias associated with the Greek god "Zeus" does not necessarily appear in the past query.

In some implementations the entity database 120 may include a database of structured data that includes nodes that represent entities and that identifies the type of each entity represented by a node. A node representing an entity may also be associated with metadata in the database of structured data (e.g., via links that represent properties of the entity). Any included metadata may include, for example, names/aliases for the entity, resource locators of search result documents that are about the entity, descriptive information about the entity, among other data. In some implementations the entity database 120 may include links between nodes and data that identifies the relationship between entities represented by linked nodes. For example, an entity that is an entity collection and represented by a node may include links to entities that are members of the entity collection and data that identifies those linked entities as members of the entity collection.

In some implementations the query session identification system 130 may access the entity database 120 to identify stored associations between queries and entities. For example, the entity database 120 may include an index of queries and associated entities. For example, for each query, a mapping (e.g., data defining an association) between the query and one or more entities related to the query may be identified in the entity database 120. In some implementations an entity may be related to a query based on the entity being present in search result documents responsive to the query. In some implementations only a certain number of entities and/or only those entities having a threshold entity score for a query are associated with the query in the content database 120. For example, for a given query, only the five highest ranking entities associated with the query are associated with the query in the content database 120. Also, for example, for a given query, only the highest ranking entity may be associated with the given query in the content database 120. In some implementations the content database 120 may include entity scores and/or other rankings for the entities associated with a given query to enable selection of only a subset of the entities (e.g., the highest X ranked entities, the entities satisfying a threshold) based on the rankings.

In some implementations an entity may be related to a query based on the entity being abundant in search result documents responsive to the query. In some implementations an entity may be related to a query based on the entity being an interpretation of the query. For example, an entity may be an interpretation of a query if that query includes an alias of the entity. For example, the entity related to the greek mythological character Zeus may be an interpretation of the query "zeus" ("zeus" is an alias of the entity), an interpretation of the query "god of sky and thunder" ("god of sky and thunder" is an alias of the entity), and/or an interpretation of the query "zeus greek mythology" ("zeus" is an alias of the entity). In some implementations an entity may be related to a query only if the entity is abundant in search result documents responsive to the query and the entity is an interpretation of the query. In some implementations the entity database 120 may be omitted. For example, in some implementations an association between a received query and one or more entities may be determined directly by the query session identification system 130 upon receipt of the query and may not be determined via accessing a database such as entity database 120.

In some implementations the entity database 120 may include an index of documents and associated entities. For example, for each of a plurality of documents, a mapping (e.g., data defining an association) between the document and one or more entities related with the document may be identified in the entity database 120. A document is any data that is associated with a document address. Documents may include HTML pages, word processing documents, portable document format (PDF) documents, images, video, and feed sources, to name just a few. The documents may include content such as, for example: words, phrases, pictures, etc.; embedded information (such as meta information and/or hyperlinks); and/or embedded instructions (such as JavaScript scripts).

Any index of documents and associated entities of the entity database 120 may optionally be accessible to the query suggestions system 140 and/or the query session identification system 130 in determining associations between a given query and one or more entities related to the given query. For example, the query session identification system 130 may associate an entity with a given past query based on association in the entity database 120 of the entity with one or more documents that are responsive to a search based on the given past query. In some implementations an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of importance of the entity to the document.

Also, for example, an association between a document and an entity may be identified based on association between that entity and other entities in the document. For example, an entity may be associated with one or more additional entities based on co-occurrence of those entities in documents of a corpus of documents and/or based on other identified link such as hyperlinks between a document describing the entity and another document describing one of the additional entities.

In some implementations the query session identification system 130 may group past queries of a user into one or more on-topic query sessions. An on-topic query session of a user is a plurality of queries of the user that may be related to one or more similar topics. For example, the queries "rivers in africa", "rivers in zambia", "zambia", "zambezi river", and "luapula river" may be identified as an on-topic query session based at least in part on a common topic related to rivers in Africa. In some implementations the one or more similar topics may be entity collections. For example, the queries "perseus", "helena", "zeus", and "andromeda" may be identified as an on-topic query session based at least in part on relation of each of the queries to an entity collection of "Greek mythological characters". Also, for example, the queries "galaxy", "milky way", "light year", "sagittarius", "andromeda", and "andromeda galaxy" may be identified as an on-topic query session based at least in part on relation of each of the queries to an entity collection of "galaxies".

In some implementations the query session identification system 130 may identify an on-topic query session by determining similarities between the past queries based on similarity between the respective past entities of the past queries. In some implementations such determination may be based on a past query similarity measure between two or more past queries, the past query similarity measure indicative of the similarity between the respective past entities of the past queries. In some implementations the past entities of the past queries for which similarities are determined may include and/or may be restricted to entity collections.

In some implementations each identified past entity may be associated with a ranking that may be utilized in determining similarities between past queries. The rankings may optionally be stored with the entities in entity database 120 and each ranking of an entity may be specific to one or more queries. The ranking of an entity for a query may be based on one or more factors. For example, the ranking may be based on an entity score for the past entity for the query. In some implementations the entity score for an entity for a query may be based on a relationship between the query and the search result documents for the query that are associated with the entity. For example, the entity score of a given entity for a query may be based on query to document relevance scores for each of the one or more search result documents for the query that are associated with the given entity. In some implementations the query to document relevance score for a given document may be based on one or more signals. Each signal may provide information about the given document and/or the relationship between the given document and the query. One example signal for a document for a query is the fraction of clicks for that query going to that document. Another example signal is a measure of the overall quality of the document.

In some implementations a ranking between the entity and search result documents associated with the entity may be utilized in determining the entity score for an entity for a query The ranking may be identified based on a database of documents and associated entities such as entity database 120. For example, for each of the identified documents, the entity database 120 may identify a ranking for one or more entities related to the document. For example, the entity database 120 may include entity to document relevance scores for each entity in each document. Each entity to document relevance score for a given entity in a given document may be indicative of the importance of the given entity in the given document. For example, in some implementations the entity to document relevance score may be based on frequency of appearance, location of appearance, and/or formatting applied to one or more occurrences of the entity in the document; and/or frequency of appearance, location of appearance, and/or formatting applied to one or more properties of the entity in the document. In some implementations the query session identification system 130 may identify a ranking between the entity and the search result documents associated with the entity without accessing a database of documents and associated entities. Additional and/or alternative factors may be considered in determining an entity to document relevance score.

The entity to document relevance scores for each of the documents associated with the entity may be utilized in determining the entity score. For example, an entity $E_1$ may be associated with search result documents $D_1$, $D_2$, and $D_3$ and the entity score for entity $E_1$ may be based on scores related to the relevance of the search result documents $D_1$, $D_2$, and $D_3$ to the entity. For example, the entity to document relevance score for entity $E_1$ may be based on summing the scores for the documents and/or averaging the scores for the documents. In some implementations the entity to document relevance scores for a given entity may be a number from zero to one.

In some implementations the entity score for an entity may be obtained by summing the product of the query to document relevance score times the entity to document relevance scores over all documents containing the entity. For example, an entity $E_1$ may be associated with search result documents $D_1$, $D_2$, and $D_3$ for a query; query to document relevance scores of $QD_1$, $QD_2$, and $QD_3$ may be obtained for those search result documents; and entity to document relevance scores of $ED_1$, $ED_2$, and $ED_3$ may be obtained for those search result documents. The entity score for the entity $E_1$ for the query may be $(QD_1 * ED_1) + (QD_2 * ED_2) + (QD_3 * ED_3)$.

In some implementations a highest ranked entity of the entities for a query may be identified as a dominant entity for that query when the ranking of the highest ranked entity satisfies a threshold, such as a threshold relative to the ranking of a lower ranked entity of the entities. For example, if an entity score for a highest ranked entity of the entities satisfies a threshold relative to the ranking of a lower ranked entity of the entities (e.g., the second highest ranked entity), then it may be identified as a dominant entity for that query.

In some implementations a cumulative ranking of a past entity may be determined based on a ranking of the past entity for each of the past queries. For example, the past entity E may be related to past queries $Q_1$ and $Q_2$, and may be associated with entity scores $S_1$ and $S_2$, respectively. In such an instance, a cumulative ranking for the past entity E may be determined based on summing and/or averaging the respective entity scores $S_1$ and $S_2$.

In some implementations determining the cumulative ranking of the past entities based on the ranking of the past entities in each of the past queries includes weighting the ranking of the past entities for more recent of the past queries greater than the ranking of the past entities for less recent of the past queries. For example, the past query $Q_1$ may be submitted prior to the past query $Q_2$. The past entity E may be related to past queries $Q_1$ and $Q_2$ with entity scores $S_1$ and $S_2$, respectively. The entity scores may be weighted based on weights $w_1$ and $w_2$, respectively, where $w_1 < w_2$, based on $Q_2$ being the more recent of the past queries $Q_1$ and $Q_2$. Accordingly, the cumulative ranking for the past entity E may be determined as $w_1 S_1 + w_2 S_2$, with $w_1 < w_2$. In some implementations the weights may be normalized.

In some implementations the past query similarity measure between a pair of past queries $Q_1$ and $Q_2$ may be determined based on the number of shared entities (e.g., entities that are common to both the past queries $Q_1$ and $Q_2$) between the past entities of $Q_1$ and $Q_2$. A higher number of shared entities between the past entities of $Q_1$ and $Q_2$ may be more indicative of similarity between the past queries $Q_1$ and $Q_2$ than a lower number of shared entities between the past entities of $Q_1$ and $Q_2$. For example, the first past query $Q_1$ may be related to past entity collections $E_{11}$, $E_{12}$, and $E_{13}$, with entity scores $S_{11}$, $S_{12}$, and $S_{13}$, respectively. The second past query $Q_2$ may be related to past entity collections $E_{21}$, $E_{22}$, $E_{23}$, and $E_{24}$, with entity scores $S_{21}$, $S_{22}$, $S_{23}$, and $S_{24}$, respectively. In a first scenario, entity collections $E_{12}$ and $E_{13}$ related to the past query $Q_1$ may be the same as entity collections $E_{23}$ and $E_{24}$ related to the past query $Q_2$. In a second scenario, entity collection $E_{12}$ related to the past query $Q_1$ may be the same as entity collection $E_{22}$ related to the past query $Q_2$. A past query similarity measure more indicative of similarity may be associated with $Q_1$ and $Q_2$ in the first scenario than in the second scenario due to the larger number of entity collections in common between $Q_1$ and $Q_2$ in the first scenario.

In some implementations the past query similarity measure between a pair of past queries may be determined based on the entity scores of the matching entities. For example, entity collections $E_{12}$ and $E_{13}$ related to the past query $Q_1$ may be the same as entity collections $E_{23}$ and $E_{24}$, respectively, related to the past query $Q_2$. The past query similarity measure between $Q_1$ and $Q_2$ may be determined based on summing and/or averaging the respective entity scores $S_{12}$, $S_{13}$, $S_{23}$, $S_{24}$. For example, when $S_{12}$ is equal to $S_{23}$ and $S_{13}$ is equal to $S_{24}$, the past query similarity measure between $Q_1$ and $Q_2$ may be determined as the sum and/or an average of $S_{12}$ and $S_{13}$. In some implementations the average may be a weighted average. In some implementations an entity may be associated with different entity scores for different queries. For example, the entity score $S_{12}$ associated with the entity collection $E_{12}$ (related to query $Q_1$) may not be equal to the entity score $S_{23}$ associated with entity collection $E_{23}$ (related to query $Q_2$) even though $E_{12}$ and $E_{23}$ may be the same entity collection. In such instances, the past query similarity measure between $Q_1$ and $Q_2$ may be determined as the sum and/or a weighted average of $S_{12}$, $S_{13}$, $S_{23}$, and $S_{24}$.

In some implementations the past query similarity measure between a pair of past queries may be identified by the query session identification system 130 by utilizing one or more methods including matching of the associated entities. In some implementations determination of whether two or more past queries are similar may be based on exact matching and/or soft matching of their respective associated entities. In some implementations soft matching between entities may be based on determining relationship distance between the entities and comparing that to a threshold. For example, query session identification system 130 may access entity database 120 to identify links that associate the entities to one another and determine a relationship distance based on such associations.

Additional and/or alternative matching techniques may be utilized. For example, the past query similarity measure between a pair of past queries may be based on the semantic distance, or length of path along edges between the respective entities in an external resource such as WordNet. In some implementations a database such as entity database 120 may include distributionally similar entities and their corresponding distributional similarity scores. Entities that typically occur in similar contexts may, for example, be considered to have similar meanings. The distributional similarity of the pair of past queries may be determined based on the distributional similarity scores of their respective past entities.

Additional and/or alternative methods may be utilized such as methods based on determining similarities between respective search results and/or search result documents related to the entities. For example, the past query similarity measure between past queries may be based on determination of a cosine similarity between respective search result documents that are responsive to the past queries. Additional and/or alternative techniques may be used to determine the past query similarity measure between a pair of past queries.

In some implementations the query session identification system 130 may identify an on-topic query session based on the past query similarity measures. For example, the user may have submitted past queries in the following order: "perseus", "zeus", "rivers", "rivers in africa", "zambezi river", "helena", and "andromeda". The past queries "perseus", "zeus", "helena", and "andromeda" may be identified as a first on-topic query session based on one or more techniques described herein. The past queries "rivers", "rivers in africa", and "zambezi river" may be identified as a second on-topic query session. In some implementations the second on-topic query session including "rivers", "rivers in africa", and "zambezi river" may be identified as an intervening on-topic query session with respect to the first on-topic query session including "perseus", "zeus", "helena", and "andromeda". In some implementations one or more on-topic query sessions may be stored with time stamp data, and/or a list of intervening on-topic query sessions. In some implementations the past queries within each on-topic query session may be optionally ranked. For example, the ranking may be based on the order in which the past queries were submitted by the user.

In some implementations past queries may be identified as part of an on-topic query session if the past query similarity measure satisfies a threshold. For example, the past query similarity measure may be a score from 0 to 1 and the threshold for the past query similarity measure may be 0.85. A pair of past queries that have a past query similarity measure greater than or equal to 0.85 may be identified as part of an on-topic query session. On the other hand, a pair of past queries that have a past query similarity measure less than 0.85 may be identified as part of different on-topic query sessions. For example, past queries "rivers in africa" and "Zambezi river" may be associated with a past query similarity measure of 0.92, based at least in part on comparison of the past entities related to the past queries. Having satisfied the threshold of 0.85, these past queries may be identified as part of an on-topic query session. As another example, past queries "zeus" and "andromeda" may be associated with a past query similarity measure of 0.95, based at least in part on comparison of the past entity collections related to the past queries. Having satisfied the threshold of 0.85, these past queries may be identified as part of an on-topic query session. Past queries "zeus" and "rivers in africa" may be associated with a past query similarity measure of 0.15, based at least in part on past entities related to the past queries. Having failed to satisfy the threshold of 0.85, these past queries may not be identified as part of an on-topic query session.

Although aspects of the description provided herein are based on comparison of a pair of past queries, additional and/or alternative combinations of past queries may be utilized to identify an on-topic query session. For example, past queries may be compared three at a time.

Query suggestion system 140 may identify candidate query suggestions in response to a user's current query. For example, the user may formulate a query via a web browser 115 and the query suggestion system 140 may identify candidate query suggestions. In some implementations the current query may be a partial query. A partial query is a query formulated by a user prior to an indication by the user that the query is a completed query. The one or more applications executing on the client device 110 may provide partial queries being formulated by users, before the users have indicated completion of the queries. The applications may be, for example, a web browser, a toolbar running in a web browser, an e-mail application, a text-messaging application, and/or a search client running on the client device 110. In some implementations the applications provide each character of a query as it is typed or otherwise entered (e.g., spoken) by the user. In some implementations the applications provide multiple characters at a time, optionally following a pause by the user between character entries.

In some implementations a user may indicate a completed query by entering a carriage return and/or other character. In some implementations a user may indicate a completed query by selecting a search button or other submission button in a user interface presented to the user. In some implementations a user may indicate a completed query by speaking a command in a speech user interface. In some implementations a user may indicate a completed query by pausing more than a predetermined amount of time during entering of the query. Other forms of providing a partial query and/or indicating a completed query may additionally and/or alternatively be utilized.

In some implementations the client device 110 may facilitate entry of user input by providing query suggestions to the user in response to a partial query entered by a user. For example, when the user enters one or more characters, the query suggestion system 140 may identify candidate query suggestions that are selected using the one or more characters. In some implementations the candidate query suggestions that are identified may include words or phrases that include the one or more characters that were entered by the user. For example, complete words or extended phrases may be suggested for partial words or partial phrases that a user has entered (e.g., using a physical or virtual keyboard). The candidate query suggestions may also include words or phrases that are similar to (e.g., synonyms or spelling corrections of) the user input. In some implementations one or more query suggestions may be selected from the candidate query suggestions and provided to the user. The user may interact with (e.g., tap, click, or otherwise affirmatively select) one of the provided query suggestions to select the query suggestion.

In some implementations, in response to a partial query being entered at client device 110, the search system 160 receives the partial query and forwards the partial query to the query suggestion system 140. In some implementations, in response to a partial query being entered at client device 110, the one or more applications executing on the client device 110 may optionally forward the partial query to the query suggestion system 140. The query suggestion system 140 includes memory for storage of data and software applications, a processor for accessing data and executing applications, and components that facilitate communication over the communication network 101.

In some implementations the candidate query suggestions may include those determined based on a list of past user queries, a list of automatically generated queries, and/or real time automatically generated queries. For example, the query suggestion system 140 may use prefix based matching to identify candidate query suggestions from a list of past user queries. Any listing of past user queries and/or past automatically generated queries may optionally be stored in a database, for potential utilization as query suggestions and/or as a basis for query suggestions. Any entity annotations of the query suggestions may also optionally be stored and/or determined via query suggestion system 140.

In some implementations the identification of the candidate query suggestions may be based on additional and/or alternative factors such as the terms of the current query, an identifier of the user who submitted the current query, and/or a categorization of the user who submitted the current query (e.g., the geographic location from where the current query was submitted, the language of the user who submitted the current query, interests of the user who submitted the current query, and/or a type of the client device 110 used to submit the current query (e.g., mobile device, laptop, desktop)).

In some implementations the query suggestion system 140 may, for each of the candidate query suggestions, identify one or more current entities related to the candidate query suggestion. In some implementations the query suggestion system 140 may, for a given candidate query suggestion, only identify a single current entity that may be related therewith. In some implementations the single current entity related to a given candidate query suggestion may be the dominant entity related to the candidate query suggestion. For example, for each candidate query suggestion a single current entity may be related to the candidate query suggestion that is the highest ranking entity for that candidate query suggestion based on one or more rankings such as, for example an entity score for the given current entity for the given candidate query suggestion.

In some implementations the entity database 120 may contain a mapping of one or more candidate query suggestions that each have multiple current entities associated therewith and the query suggestion system 140 may reduce the mapping by associating, for each candidate query suggestion, only a single dominant current entity therewith. For example, the entity database 120 may contain a mapping of one or more candidate query suggestions that each have multiple ranked current entities related to therewith and the query suggestion system 140 may generate a reduced mapping that only includes candidate query suggestions with each candidate query suggestion mapped to a single highest ranked current entity related therewith. In some implementations the current entity related to a candidate query suggestion may be identified from current entities of such a reduced mapping.

In some implementations the query suggestion system 140 may, for a given candidate query suggestion, only identify entities related therewith if a ranking of the entities for the given candidate query suggestion satisfies a threshold. For example, for each candidate query suggestion, only those entities having an entity score for the given candidate query suggestion that satisfies a threshold may be identified. For example, the entity with the highest entity score may be identified, along with any other entities having an entity score that is within a threshold of the highest entity score.

In some implementations the one or more entities related to each candidate query suggestion that are determined by the query suggestion system 140 may be entity collections. In some implementations the query suggestion system 140 may, for a given candidate query suggestion, identify the entity collections directly such as, for example, via a mapping of queries to entity collections associated with the queries. In some implementations the query suggestion system 140 may, for a given candidate query suggestion, initially determine one or more entities related to the candidate query suggestion that are not entity collections. For example, the query suggestion system 140 may identify one or more dominant entities that are not entity collections and/or one or more entities that are not entity collections and that have a ranking that satisfies a threshold. The query suggestion system 140 may then identify one or more entity collections to which the entities belong and associate such entities with the given candidate query suggestion.

As one example, for a query "zeus", the query suggestion system 140 may determine that the entity related to the Greek mythological character Zeus is the dominant entity based on a query to entity mapping in entity database 120. The query suggestion system 140 may then determine entity collections to which the entity related to Greek mythological character Zeus belongs and associate those entity collections with the query "zeus". For example, the query suggestion system 140 may determine the entity collections to which Zeus belongs based on a mapping between the entity related to the Greek mythological character Zeus and entity collections such as "heroes", "fictional characters", "names", etc. In some implementations the entity database 120 may, for a given entity, associate the entity with all entity collections to which the entity belongs. In some implementations the entity database 120 may, for a given entity, only associate the entity with those entity collections for which the entity has at least a threshold ranking. A ranking of an entity for an entity collection is indicative of the strength of association of that entity with the entity collection. The ranking of the entity for an entity collection may be based on one or more factors such as frequency and/or prominence of occurrence of properties of the entity collection in documents that include the entity. For example, the entity associated with the president George Washington may have a higher ranking in the entity collection of "presidents" than in the entity collection of "authors". The higher ranking for the entity collection of "presidents" may be based on, for example, greater frequency of occurrence of properties of the entity collection of "presidents" in documents that contain the entity as compared to frequency of occurrence of properties of the entity collection of "authors" in those documents.

As another example, for a query "sting", the query suggestion system 140 may determine, based on a query to entity mapping in entity database 120, that the entity related to the musician Gordon Matthew Thomas Sumner is related to the query and that the entity related to the wrestler Steve Borden is also related to the query. The query suggestion system 140 may then determine entity collections to which the entity related to musician Gordon Matthew Thomas Sumner belongs (e.g., "musicians", "celebrities", "artists", etc.) and associate those entity collections with the query "sting" and determine entity collections to which the entity related to the wrestler Steve Borden belongs ("wrestlers", "celebrities", etc.) and also associate those entity collections with the query "sting". In some implementations each of the entity collections associated with the query may be associated with identifiers indicating which of the entities belong to the entity collection. For example, the entity collection "wrestlers" may be associated with an identifier indicating the entity related to the wrestler Steve Borden belongs to that collection, whereas the entity collection "celebrities" may be associated with an identifier indicating that the entity related to the wrestler Steve Borden and the entity related to the musician Gordon Matthew Thomas Sumner both belong to that collection.

In some implementations the ranking system 150 may determine a candidate query similarity measure for a given candidate query suggestion of the candidate query suggestions based on similarity between the one or more current entities related to the given candidate query suggestion and the one or more past entities related to the identified past queries. For example, the ranking system 150 may determine a candidate query similarity measure for a given candidate query suggestion of the candidate query suggestions based on similarity between the one or more current entity collections related to the given candidate query suggestion and the one or more past entity collections related to the identified past queries. In some implementations a higher candidate query similarity measure may be more indicative of similarity between a past query and the given candidate query suggestion. Determination of a candidate query similarity measure may be based on one or more techniques described herein. For example, the candidate query similarity measure may be determined utilizing techniques similar to those used in determining the past query similarity measure. For example, the current entity collections related to the given candidate query suggestion may be compared to the past entity collections related to the one or more past queries to determine the candidate query similarity measure for the given candidate query suggestion.

In some implementations the candidate query similarity measure may be indicative of whether one or more of the current entities of the given candidate query suggestion match one or more of the past entities. For example, the candidate query similarity measure may be indicative of whether one or more of the current entity collections of the given candidate query suggestion match one or more of the past entity collections. If the given candidate query suggestion has one or more entities in common with the past entities, then the candidate query similarity measure may be 1; otherwise the candidate query similarity measure may be 0.

In some implementations the candidate query similarity measure may be based on the number of matching entities between the one or more current entities related to the given candidate query suggestion and the one or more past entities related to the identified past queries. For example, the candidate query similarity measure may be based on the number of matching entity collections between the one or more current entity collections related to the given candidate query suggestion and the one or more past entity collections related to the identified past queries. In some implementations the candidate query similarity measure may be proportional to the number of matching entities between the one or more current entities related to the given candidate query suggestion and the one or more past entities related to the identified past queries. For example, one matching entity may be less indicative of similarity between a past query and the given candidate query suggestion than two matching entities.

In some implementations the candidate query similarity measure may be based on a comparison of: (1) the number of current entities related to the given candidate query suggestion that match the past entities related to the identified past queries to (2) a group of the current entities that includes current entities that do not match the past entities. In some implementations the group of the current entities that includes current entities that do not match the past entities includes all identified of the current entities. In some implementations the group of the current entities that include current entities that do not match the past entities includes only the identified current entities that do not match the past entities. The candidate query similarity measure may become more indicative of similarity as the number of matching entity collections increases and/or the number of non-matching entities in the group decreases. For example, in some implementations a higher candidate query similarity measure may be more indicative of similarity than a lower candidate query similarity measure. In some of those implementations the candidate query similarity measure may be based on one or more equations that compare the number of current entities that match the past entities to a group of the current entities that includes current entities that do not match the past entities, such as:

Candidate Query Similarity Measure=[(number of current entities that match the past entities)/ (number of current entities that do not match the past entities)];

Candidate Query Similarity Measure=[(number of current entities that match the past entities)/ (total number of current entities)];

As an example: a first candidate query suggestion may be related to ten (10) current entity collections, six (6) of which match one or more past entity collections; and a second candidate query suggestion may be related to seven (7) current entity collections, five (5) of which match the one or more past entity collections. The candidate query similarity measures for each candidate query suggestion may be determined as [(number of current entities that match the past entities)/(total number of current entities)]. Thus, the candidate query similarity measure for the first candidate query suggestion may be 0.6 (6/10) and the candidate query similarity measure for the second candidate query suggestion may be 0.71 (5/7).

In some implementations the candidate query similarity measure may additionally and/or alternatively be based on a comparison of: (1) the number of past entities related to the identified past queries that match the current entities related to the given candidate query suggestion to (2) a group of the past entities that includes past entities that do not match the current entities. The candidate query similarity measure may become more indicative of similarity as the number of matching entity collections increases and/or the number of non-matching entity collections in the group decreases. For example, in some implementations a higher candidate query similarity measure may be more indicative of similarity than a lower candidate query similarity measure. In some of those implementations the candidate query similarity measure may be based on one or more equations that compare the number of past entities that match the current entities to a group of past entities that includes one or more past entities that do not match the current entities, such as:

Candidate Query Similarity Measure=[(number of past entities that match the current entities)/(number of past entities that do not match the current entities)];

Candidate Query Similarity Measure=[(number of past entities that match the current entities)/(total number of past entities)];

As an example: one or more past queries may be related to ten (10) past entity collections, six (6) of which match current entity collections of a candidate query suggestion. The candidate query similarity measure for the candidate query suggestion may be determined as [(number of past entities that match the current entities)/(total number of past entities)]. Thus, the candidate query similarity measure for the candidate query suggestion may be 0.6 (6/10).

In some implementations the candidate query similarity measure may be based on both a comparison of: (1) the number of current entities related to the given candidate query suggestion that match the past entities related to the identified past queries to (2) the group that includes one or more current entities that do not match the past entities; and (1) the number of past entities related to the identified past queries that match the current entities related to the given candidate query suggestion to (2) the group that includes past entities that do not match the current entities. As an example: a first candidate query suggestion may be related to ten (10) current entity collections, six (6) of which match one or more past entity collections; and the past queries may be related to eight (8) past entity collections, six (6) of which match one or more current entity collections. The candidate query similarity measures for the candidate query suggestion may be determined as [(number of current entities that match the past entities)/(total number of current entities)]*[(number of past entities that match the current entities)/(total number of past entities)]. Thus, the candidate query similarity measure may be 0.45 [(6/10)*(6/8)].

In some implementations the candidate query similarity measure may be based on a popularity measure of the one or more current entities related to the given candidate query suggestion that match the one or more past entities related to the identified past queries. Each popularity measure is indicative of the popularity of a respective entity. For example, the popularity measure associated with the entity associated with the country "United States" may be more indicative of popularity than the popularity measure associated with the entity that may be associated with the country "Botswana". As another example, the popularity measure associated with the entity associated with the soccer player "Pele" may be more indicative of popularity than the popularity measure associated with the entity associated with the soccer player "Palacio".

In some implementations the popularity measure of the given entity may be based on a click-rate associated with the given entity (e.g., click-rate of documents associated with the given entity). For example, a higher popularity measure may be indicative of higher click-rate for the given entity. For example, an entity collection of "celebrities" may be associated with a higher click-rate than an entity collection of "constellations". In some implementations the popularity measure of the given entity may be based on popularity of the given entity in a corpus of documents. For example, the corpus of documents may include a random corpus of documents such as a random selection of internet-based documents. As an example, an entity collection of "names" may be more popular in a corpus of documents than an entity collection of "greek heroes". In some implementations the popularity measure may be based on a submission frequency of queries including an identifier of the entity. In some implementations the popularity measure of an entity collection may be based on a submission frequency of queries that are mapped to the entity collection. In some implementations the popularity measure of an entity collection may be based on the number of entities that are members of the entity collection (e.g., more members indicative of a higher popularity measure), the popularity of the members of the entity collection (e.g., more popular members indicative of a higher popularity measure of the entity collection), and/or other measures related to the members of the entity collection. In some implementations the popularity measures for entities may be stored in a database such as entity database 120.

In some implementations the candidate query similarity measure for the candidate query suggestion may be adjusted based on the popularity measures of the matching entities. This may enable promoting certain entities that are not highly popular, as relation of such entities to a query may be more meaningful than relation of a highly popular entity to a query. For example, a weighted average of the candidate query similarity measure and an aggregate popularity measure of the matching entities may be utilized to determine the candidate query similarity measure. An aggregate popularity measure may be a linear combination, a weighted average, a median, or some other statistically relevant average. For example, the candidate query similarity measure may be determined based on w*(1/f)+(1−w)*s, where w is a weight between zero and one, f is an aggregate popularity measure for the matching entities, and s is the candidate query similarity measure. A weight of one may correspond to a candidate query similarity measure based entirely on the popularity measure for the matching entities. A weight of zero may correspond to a candidate query similarity measure based entirely on the candidate query similarity measure.

As an example, assume a past query of "Andromeda" and a current partial query of "a". The entity collection of "galaxies" may be the only matching entity between the past query "Andromeda" and a candidate query suggestion "Antlia". The entity collection of "fictional characters" may be the only matching entity collection between the past query "Andromeda" and a candidate query suggestion "Atticus Finch". The entity collection of "galaxies" may correspond to a lower popularity measure than the entity collection of "fictional characters". In other words, the entity collection of "fictional characters" may be more popular than the entity collection of "galaxies". In some implementations the candidate query similarity measure for the candidate query suggestion "Antlia" for the past query "Andromeda" may be more indicative of similarity than the similarity measure for the candidate query suggestion of "Atticus Finch" for the past query "Andromeda" based at least in part on the lower popularity measure associated with the entity collection of "galaxies". Accordingly, in some implementations the ranking of the candidate query suggestion of "Antlia" may be promoted more than the candidate query suggestion of "Atticus Finch" based on the lower popularity of the entity collection "galaxies" as compared to the entity collection "fictional characters".

In some implementations the candidate query similarity measure may be a real number. In some implementations the candidate query similarity measure may be normalized to a real number between zero and one. In some implementations a candidate query similarity measure of one may be indicative of a maximum measure of similarity between the candidate query suggestion and the one or more past queries. On the other hand, a candidate query similarity measure of zero may be indicative of a minimum measure of similarity between the candidate query suggestion and the one or more past queries. In some implementations the query suggestion system 140 may additionally and/or alternatively adjust the candidate query similarity measure based on one or more techniques disclosed herein.

In some implementations the candidate query suggestions may be ranked based on the candidate query similarity measures. In some implementations the given candidate query suggestion of the candidate query suggestions may be selected as a query suggestion if the candidate query similarity measure of the given candidate query suggestion satisfies a threshold. For example, in some implementations where the ranking is based on the candidate query similarity measure for the candidate query suggestion and a higher score is associated with a higher ranking, the threshold may be satisfied if the candidate query similarity measure of the candidate query suggestion exceeds the threshold. In some implementations the top N candidate query suggestions may be selected as query suggestions to be provided to the user.

In some implementations one or more of the candidate query suggestions may be associated with a ranking based on one or more factors that are distinct from the candidate query similarity measure based on matching entities as described herein. For example, the candidate query suggestions may be identified from a ranked list of past user queries, and/or a ranked list of automatically generated queries. The ranked list may be ranked based on factors such as an overall popularity score for the candidate query suggestions, and/or a popularity score for the candidate query suggestions for the entered query for which they are identified. As another example, the ranking of the identified candidate query suggestions may be based on the user who submitted the current query, and/or a categorization of the user who submitted the current query (e.g., the geographic location from where the current query was submitted, the language of the user who submitted the current query, interests of the user who submitted the current query, and/or a type of the client device 110 used to submit the current query (e.g., mobile device, laptop, desktop)). In some implementations the query suggestion system 140 may access a database such as entity database 120 to identify such ranking of identified candidate query suggestions.

In some implementations the ranking of a given candidate query suggestion may be adjusted based on the candidate query similarity measure for the given candidate query suggestion. For example, the given candidate query suggestion may be associated with a ranking score r and a candidate query similarity measure s. The ranking of the given candidate query suggestion may be adjusted based on a weighted average of the ranking score r and the candidate query similarity measure s, pr+(1−p) s. When p is equal to 0, the ranking may be based only on the candidate query similarity measure s; when p equals 1, the ranking may be based only on the ranking score r.

In some implementations the adjusted ranking may be based on the sum of the ranking score r and the candidate query similarity measure s. For example, candidate query suggestion $Q_1, Q_2, \ldots, Q_{50}$ may be identified by the query suggestion system 140. The candidate query suggestions may be associated with ranking scores, for example, in the order of diminishing values, $r_1=0.8, r_2=0.75, \ldots, r_{50}=0.01$. The candidate query suggestions may be additionally associated with candidate query similarity measures $s_1=0, s_2=0, \ldots, s_{49}=0, s_{50}=1$, indicating that the candidate query suggestions $Q_1, Q_2, \ldots, Q_{49}$ do not have entities in common with the past entities, and candidate query suggestion $Q_{50}$ may have one or more entities in common with the past entities. Accordingly, the adjusted ranking scores may be determined by taking the sums of the respective ranking scores and candidate query similarity measures to be 0.8, 0.75, ..., 1.01, respectively. Based at least in part on such adjusted ranking scores, candidate query suggestion $Q_{50}$ may be promoted as the highest ranked query suggestion.

As another example, the candidate query similarity measure for the given candidate query suggestion may be indicative of the number of matching entities, and the ranking of the given candidate query suggestion may be adjusted based on adding the ranking score for the given candidate query suggestion to the number of matching entities. For example, query $Q_1$ may have one entity in common with the past entities and query $Q_{50}$ may have three entities in common with the past entities. Queries $Q_2, \ldots, Q_{49}$ may not have any entities in common with the past entities. Accordingly, the adjusted ranking scores may be determined by taking the sums of the respective ranking scores and candidate query similarity measures to be 1.8, 0, ..., 0, 2.01, respectively. Based at least in part on such adjusted ranking scores, candidate query suggestion $Q_{50}$ may be promoted as the highest ranked query suggestion, followed by the candidate query suggestion $Q_1$. In some implementations $Q_2, \ldots, Q_{49}$ may not be provided as suggested queries by the query suggestion system 140.

In some implementations the ranking score r may be multiplied by the candidate query similarity measures. The ranking of the given candidate query suggestion may be adjusted based on r*s. For the example above, the adjusted ranking scores may be determined by taking the products of the respective ranking scores and candidate query similarity measures to be 0, 0, ..., 0.01, respectively. Based at least in part on such adjusted ranking scores, candidate query suggestion $Q_{50}$ may be promoted as the highest ranked query suggestion. As another example, the candidate query similarity measure for the given candidate query suggestion may be indicative of the number of matching entities, and the ranking of the given candidate query suggestion may be adjusted based on multiplying a ranking score for the given candidate query suggestion with the number of matching entities. For example, query $Q_1$ may have one entity in common with the past entities and query $Q_{50}$ may have three entities in common with the past entities. Queries $Q_2, \ldots, Q_{49}$ may not have any entities in common with the past entities. Accordingly, the adjusted ranking scores may be determined by taking the products of the respective ranking scores and candidate query similarity measures to be 0.8, 0, . . . , 0, 0.02, respectively. Based at least in part on such adjusted ranking scores, candidate query suggestion $Q_1$ may be promoted as the highest ranked query suggestion, followed by the candidate query suggestion $Q_{50}$.

In some implementations the given candidate query suggestion of the candidate query suggestions may be selected as a query suggestion if the adjusted ranking of the given candidate query suggestion satisfies a threshold. For example, in some implementations where the ranking is based on the adjusted ranking score associated with the candidate query suggestion and a higher score is associated with a higher ranking, the threshold may be satisfied if the adjusted ranking score of the candidate query suggestion exceeds the score of a threshold value. In some implementations the top N candidate query suggestions may be selected as query suggestions to be provided to the user.

In some implementations the candidate query similarity measure may be further boosted by applying an appropriate boost transformation. The boost transformation may amplify the effect of small perturbations in the candidate query similarity measures for candidate query suggestions. For example, the candidate query similarity measure s may be boosted by a transformation such as:

$$\frac{1}{1-\sqrt{s}}.$$

A small change in the value of the candidate query similarity measure may result in a large change in the boosted candidate query similarity measure. For example, for s=0.95, the boosted candidate query similarity measure may be determined as 39.49; and for s=0.96, the boosted candidate query similarity measure may be determined as 49.49. Accordingly, a small change in the candidate query similarity measure may correspond to a large change in the boosted candidate query similarity measure. In some implementations the boost transformation may only be applied to the top N highly ranked candidate query suggestions based on the candidate query similarity measure and the existing ranking may be adjusted only for such highly ranked candidate query suggestions.

For example, the existing ranking scores for three candidate query suggestions $CQ_1$, $CQ_2$, and $CQ_3$ may be identified as 25, 10, and 5, and the candidate query similarity measures may be determined as 0.1, 0.95 and 0.96, respectively. Candidate query similarity measures for $CQ_2$, and $CQ_3$ may be identified as being associated with the top two candidate query similarity measures. The boost transformation may be applied to the candidate query similarity measures for $CQ_2$, and $CQ_3$ to obtain adjusted candidate query similarity measures 39.49 and 49.49 respectively. Accordingly, the existing ranking scores for $CQ_1$, $CQ_2$, and $CQ_3$ may be adjusted as 25, 39.49 and 49.49 respectively. Based at least in part on such adjusted ranking, the candidate query suggestions may be ranked as $CQ_3$, $CQ_2$, and $CQ_1$, and provided to the user in that order.

In some implementations the boost transformation may only be applied to the candidate query similarity measure for $CQ_3$. Accordingly, the existing ranking scores for $CQ_1$, $CQ_2$, and $CQ_3$ may be adjusted as 25, 10, and 49.49 respectively. Based at least in part on such adjusted ranking, the candidate query suggestions may be ranked as $CQ_3$, $CQ_1$, and $CQ_2$, and provided to the user in that order. In some implementations the adjusted ranking for $CQ_2$ may fail to satisfy a threshold and $CQ_3$ and $CQ_1$ may be provided to the user in that order, optionally with additional query suggestions. In some implementations the boost transformation may be applied to the candidate query similarity measure for each candidate query suggestion. In some implementations the candidate query suggestions may be ranked based on the boosted candidate query similarity measures. In some implementations a given candidate query suggestion of the candidate query suggestions may be selected as a query suggestion if the boosted candidate query similarity measure of the given candidate query suggestion satisfies a threshold.

In some implementations the query suggestion system 140 may optionally determine whether the given candidate query suggestion may be included in an identified on-topic query session. Such determination may be based on one or more techniques disclosed herein to identify an on-topic query session for past queries. For example, current entities related to the given candidate query suggestion may be compared to the past entities related to the past queries included in the identified on-topic query session to determine if a threshold is satisfied. In some implementations a candidate query similarity measure may be determined based on a comparison of the respective entities for each identified query session, such as entity collections for each identified query session. The candidate query suggestion may be determined to be in an identified query session if the candidate query similarity measure satisfies a threshold.

For example, the user may have issued past queries for "poseidon" followed by "perseus". The query session identification system 130 may identify matching past entity collections for the past queries such as "greek mythology", "fictional characters", "constellations", "names", among others. Based at least in part on these matching past entity collections, the query session identification system 130 may identify the past queries "poseidon" and "perseus" as being included in an on-topic query session. The user may start typing a current query such as "an". The query suggestion system 140 may identify "andromeda", "anthem", "ann taylor", and "andrew wiggins" as candidate query suggestions. The query session identification system 130 may identify current entity collections related to each candidate query suggestion. For example, the candidate query suggestion "andromeda" may be related to current entity collections including entity collections such as "greek mythology", "fictional characters", "constellations", "names", among others. Based at least in part on comparison of the current entity collections with the past entity collections, the query session identification system 130 may identify the candidate query suggestion "andromeda" as part of the identified on-topic query session.

On the other hand, the current entities related to the candidate query suggestion "ann taylor" may include no entity collections, or a nominal number of entity collections related to the identified past entity collections. Based at least in part on comparison of such current entity collections with the identified past entity collections, the query session identification system 130 may determine that the candidate query suggestion "ann taylor" is not a part of the identified on-topic query session. Likewise, the current entities related to the candidate query suggestions "andrew wiggins" and "anthem" may include no entity collections, or a nominal number of entity collections related to the identified past entity collections. Based at least in part on comparison of such current entity collections with the identified past entity collections, the query session identification system 130 may determine that the candidate query suggestions "andrew wiggins" and "anthem" are not a part of the identified on-topic query session.

In some implementations the query suggestion system 140 may determine that "anthem", "ann taylor", and "andrew wiggins" may not be selected as query suggestions to be provided to the user in response to the partial query "an" and/or may demote a raking associated with such query suggestions. In some implementations the query suggestion system 140 may determine that "andromeda" may be provided to the user in response to the partial query "an" and/or may promote a ranking associated with the query suggestion "andromeda".

In some implementations the selected query suggestions may be provided to a user via a computing device 110. In some implementations the number of selected query suggestions displayed may depend on the computing device 110. For example, fewer selected query suggestions may be displayed on a mobile device than may be displayed on a desktop device.

Figure 2:
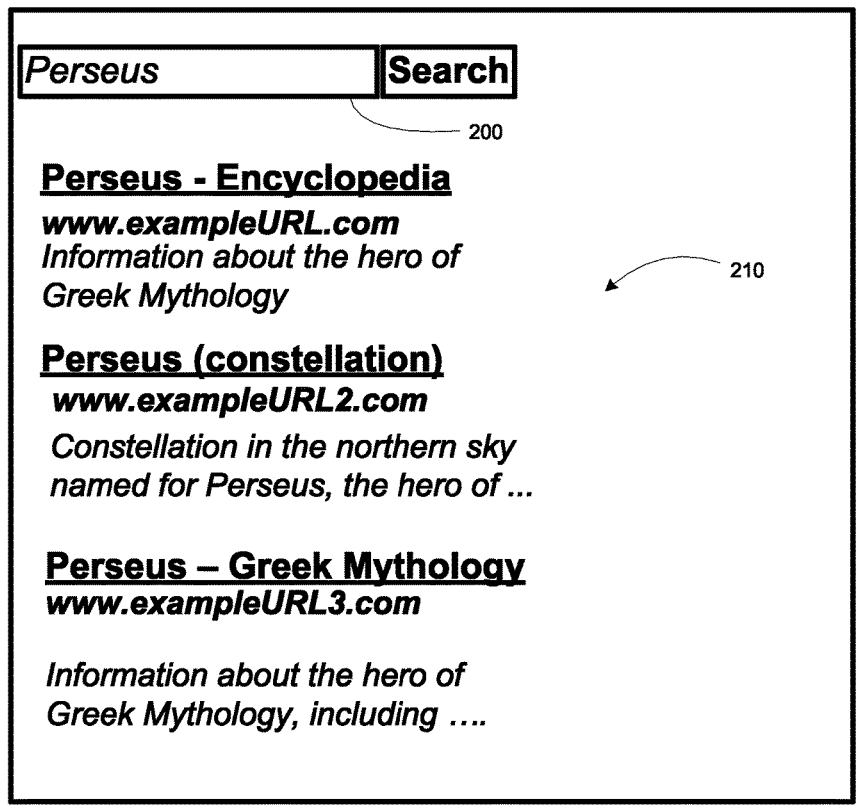
FIG. 2 illustrates an example graphical user interface for displaying search results in response to a query.

FIG. 2A illustrates an example graphical user interface for displaying search results in response to a query. For example, the user may have issued a past query 200, "Perseus". The search system 160 may receive the past query 200 from the client device 110 and/or other component and may return search results 210 in response to the past query 200. For example, in response to the past query 200 from the computing device 110, the search system 160 may provide a plurality of search results 210 to be displayed in the web browser 115 that is executing on the client device 110. Based on the past query "Perseus" the query session identification system 130 may identify past entities such as entity collections that may be associated with the Greek mythological character Perseus and/or the constellation Perseus. For example, entity collections associated with the Greek mythological character Perseus may include, for example, entity collections of "heroes", "opera characters", "film characters", "characters", "greek heroes", "names", among others.

FIG. 3A illustrates an example graphical user interface for displaying query suggestions 230A in response to a partial query 220A of "an". The query suggestions 230A illustrated in the example of FIG. 3A are examples of query suggestions selected for display without taking into account the past entities associated with the past query 200 of "perseus" of FIG. 2. For example, the query suggestion system 140 may select the query suggestions 230A of FIG. 3A for display based on traditional and/or other techniques such as, for example, a selection rate of the query suggestions for the partial query "an". The query suggestions 230A of FIG. 3A include the query suggestions of "anthropologie", "ann taylor", "animal jam", and "anthem".

FIG. 3B illustrate another example graphical user interface for displaying query suggestions 230B in response to a partial query 220B of "an". The query suggestions 230C illustrated in the example of FIG. 3B are examples of query suggestions selected for display in response to a partial query after issuing the past query "perseus" of FIG. 2. The query suggestions are selected based solely or predominantly on a candidate query similarity measure. The query suggestion system 140 identifies a plurality of candidate query suggestions based on the partial query 220B, such as "andromeda", "antigone", "antaues", "andromeda galaxy", "anthropologie", "ann taylor", "animal jam", and "anthem". The ranking system 150 may determine similarity measures for each of the candidate query suggestions and rank the candidate query suggestions based on their respective candidate query similarity measures. For example, the ranking system 150 may determine similarity measures for the candidate query suggestions "andromeda", "antigone", "antaues", and "andromeda galaxy" that are indicative of a high degree of similarity based at least in part on the number of shared current and past entity collections that may be associated with the past query and those candidate query suggestions (e.g., entity collections such as "fictional characters", "greek heroes", "art subjects", "galaxies", etc.). Based solely or predominantly on the candidate query similarity measure, the ranking system 150 may rank the candidate query suggestions and find that "andromeda", "antigone", "antaues", and "andromeda galaxy", are the highest ranked candidate query suggestions, in that order. The ranking system 150 may select "andromeda", "antigone", "antaues", and "andromeda galaxy", in that order, as query suggestions that may be provided to the user as query suggestions 230B in response to the partial query "an". The query suggestions 230B may be provided via a drop-down menu from the search box as illustrated. In some implementations the user may interact with (e.g., tap, click, or otherwise affirmatively select) one of the provided query suggestions to select the query suggestion.

FIG. 3C illustrate another example graphical user interface for displaying query suggestions 230C in response to a partial query 220C of "an". The query suggestions 230C illustrated in the example of FIG. 3C are examples of query suggestions selected for display in response to a partial query after issuing the past query "perseus" of FIG. 2. The query suggestions are selected based on a candidate query similarity measure and based one or more additional ranking measures associated with the query suggestions. Based on the partial query 220C, the query suggestion system 140 identifies a plurality of candidate query suggestions such as "andromeda", "antigone", "antaues", "andromeda galaxy", "anthropologie", "ann taylor", "animal jam", and "anthem" as candidate query suggestions. The ranking system 150 may determine initial rankings for the candidate query suggestions such as rankings based on a selection rate, user location, user history, etc. The initial rankings may indicate that the candidate query suggestions are ranked in the order "anthropologie", "ann taylor", "animal jam", "anthem", "andromeda", "antigone", "antaues", "andromeda galaxy", with "anthropologie" being the highest ranked candidate query suggestion. The query suggestion system 150 may also determine candidate query similarity measures of the candidate query suggestions. The ranking system 150 may determine that the candidate query suggestion "andromeda" has the highest candidate query similarity measure and promote the ranking of the candidate query suggestion "andromeda" based on its candidate query similarity measure. For example, the ranking system 150 may assign the highest ranking to the candidate query suggestion "andromeda" and not modify the ranking of the other candidate query suggestions. The query suggestion system 140 may select, based on the modified ranking, "andromeda", "anthropologie", "ann taylor", and "animal jam", in that order, as query suggestions that may be provided to the user as query suggestions 230C in response to the partial query "an". The query suggestions 230C may be provided via a drop-down menu from the search box as illustrated.

FIG. 3D illustrate another example graphical user interface for displaying query suggestions 230D in response to a partial query 220D of "an". The query suggestions 230D illustrated in the example of FIG. 3D are examples of query suggestions selected for display in response to a partial query after a series of past queries of "Comet", "Sagittarius", "Milky Way", "Galaxy", and "Perseus". The query suggestions are selected based on a candidate query similarity measure and based one or more additional ranking measures associated with the query suggestions. Based on the partial query 220B, the query suggestion system 140 identifies a plurality of candidate query suggestions such as "Andromeda", "Antigone", "Antaues", "Andromeda Galaxy", "anthropologie", "ann taylor", "animal jam", and "anthem". The ranking system 150 may determine rankings for the candidate query suggestions such as rankings based on a selection rate, user location, user history, etc. The rankings may indicate that the candidate query suggestions are ranked in the order "anthropologie", "ann taylor", "animal jam", "anthem", "Andromeda", "Antigone", "Antaues", "Andromeda Galaxy", with "anthropologie" being the highest ranked candidate query suggestion. The ranking system 150 may also determine candidate query similarity measures for the candidate query suggestions. The ranking system 150 may determine that the candidate query suggestion "andromeda galaxy" has the highest candidate query similarity measure based on "andromeda galaxy" and the past queries being related to common entity collections such as "galaxies", "celestial objects", etc. and promote the ranking of the candidate query suggestion "andromeda galaxy" based on its candidate query similarity measure. For example, the ranking system 150 may assign the highest ranking to the candidate query suggestion "andromeda galaxy" and not modify the ranking of the other candidate query suggestions. The query suggestion system 140 may select, based on the modified ranking, "andromeda galaxy", "anthropologie", "ann taylor", and "animal jam", in that order, as query suggestions that may be provided to the user as query suggestions 230D in response to the partial query "an". The query suggestions 230E may be provided via a drop-down menu from the search box as illustrated.

Referring now to FIG. 4A, a table illustrates example methods of determining cumulative entity scores. The rows are labeled by letters A through F and the columns are labeled by numbers 1 through 9. A position XY will refer to the entry in row X and column Y. Four entities $E_1$, $E_2$, $E_3$, $E_4$ are shown in column 1, and their popularity measures are illustrated in column 2. For example, entity $E_1$ at position C1 may be associated with a popularity measure 0.2 at position C2. Column 3 illustrates example entity scores for the entities related to a first past query. For example, entity score for $E_1$ related to the first past query may be $PQ_1=0.7$ at position C3. Cumulative entity scores may be determined for a given entity by aggregating the individual entity scores for an entity related to each past query. For example, the aggregate may be an average, as illustrated by the formula $ES_1=(PQ_1+PQ_3+PQ_3)/3$ at position B6. For example, the entity $E_1$ may be associated with a cumulative entity score of 0.630 at position C6, which may be determined as (0.7+0.6+0.6)/3.

In some implementations entities related to a more recent past query may be associated with a weight more indicative of relevance than the entities related to a less recent past query. For example, as indicated at position B7, the first past query may be associated with a weight $w_1$ that may be equal to 0.6, the second past query may be associated with a weight $w_2$ that may be equal to 0.8, and the most recent past query, the third past query, may be associated with a weight $w_3$ that may be equal to 1. In such instances, the cumulative entity score for an entity may be aggregated by taking a weighted average of the individual entity scores, as illustrated by the formula $ES_2=(PQ_1*w_1+PQ_3*w_2+PQ_3*w_3)/3$ at position B7. For example, the entity $E_1$ may be associated with a cumulative entity score of 0.500 at position C7, which may be determined as (0.7*0.6+0.6*0.8+0.6*1)/3.

In some implementations the cumulative entity score may be adjusted based on the popularity measure. For example, the cumulative entity score computed in Column 6 may be multiplied by the reciprocal of the popularity measure in Column 2. For example, the ranking system 150 may determine $ES_1*(1/f)$. For example, the popularity measure for entity $E_1$ may be identified as 0.2, as illustrated at position C2. The cumulative entity score 0.630 at position C6 may be multiplied by the reciprocal of the popularity measure 0.2 to obtain 3.15. Similar determinations may be made for each of the entities $E_2$, $E_3$, and $E_4$, to obtain 0.8, 2, and 2.64 respectively. In some implementations the values 3.15, 0.8, 2, and 2.64 may be normalized. For example, their sum may be determined to 3.15+0.8+2+2.64=8.59; and each value may be divided by the sum to obtain a normalized value. For example, the adjusted cumulative entity score for $E_1$ may be determined as 3.15/8.59=0.367, as illustrated at position C8; the adjusted cumulative entity score for $E_2$ may be determined as 0.8/8.59=0.093, as illustrated at position D8; and so forth. Likewise, the cumulative entity scores $ES_2$ illustrated in Column 7, may be adjusted based on the popularity measure of the respective entity, and then normalized. Such adjusted cumulative entity scores are illustrated in Column 9.

Referring now to FIG. 4B, a table illustrates example methods of determining rankings for candidate query suggestions. The rows are labeled by letters A through G and the columns are labeled by numbers 1 through 11. A position XY will refer to the entry in row X and column Y. The query suggestion system 140 may identify candidate query suggestion $CQ_1$, $CQ_2$, . . . $CQ_{50}$ as shown in column 1. The ranking system 150 may associate each candidate query suggestion with a ranking, as illustrated in Column 2. For example, entity $CQ_1$ at position C1 may be associated with a ranking score 15 at position C2. The query session identification system 130 may identify matching entities. For example, it may be determined that the candidate query suggestion $CQ_1$ has one entity $E_4$ in common with the past entities related to the four past queries identified with reference to FIG. 4A. In some implementations, for a given candidate query suggestion, each past entity $E_1$, $E_2$, $E_3$, and $E_4$, may be identified with entity scores based on whether or not the entity is a common entity related to the given candidate query suggestion. For example, for the candidate query suggestion $CQ_1$, the entity scores associated with $E_1$, $E_2$ and $E_3$ may be equal to 0 (as illustrated by the entries at positions C3, C4 and C5 respectively), indicating that these past entities are not in common with the entities related to $CQ_1$; and the entity score associated with $E_4$ may be equal to 1 (as illustrated by the entry at position C6), indicating that this past entity is in common with the entities related to $CQ_1$. Similar determinations may be made for candidate queries $CQ_2$, . . . $CQ_{50}$. Other choices for the entity scores are possible. For example, each entity score may be a real number between 0 and 1 that is indicative of the strength of the relation of the entity for the given query suggestion.

In some implementations a candidate query similarity measure may be determined for each candidate query suggestion. For example, the candidate query similarity measure may be either a 1 or a 0, indicative of whether or not the candidate query suggestion shares a matching entity. In some implementations the candidate query similarity measure may be the number of matching entities. In some implementations the candidate query similarity measure may be the sum, $S_1$, of the cumulative entity scores for the matching entities. For example, the candidate query suggestion $CQ_1$ has one matching entity $E_4$. Based on the entry at position F6 in FIG. 4A, the candidate query similarity measure for $CQ_1$ may be determined to be 0.066, as illustrated at position C7 in FIG. 4B. As another example, the candidate query suggestion $CQ_2$ has two matching entities $E_1$ and $E_4$. Based on the entries at positions C6 and F6 respectively in FIG. 4A, the candidate query similarity measure for $CQ_2$ may be determined to be 0.630+ 0.066=0.696, as illustrated at position D7 in FIG. 4B. Column 7 in FIG. 4B illustrates example values for the candidate query similarity measures for the other candidate queries based on such determination.

In some implementations the candidate query similarity measure may be based on the adjusted similarity measure. For example, the candidate query similarity measure may be the sum, $S_2$, of the normalized values for $ES_1*(1/f)$ for the matching entities. For example, the candidate query suggestion $CQ_1$ has one matching entity $E_4$. Based on the entry at position F8 in FIG. 4A, the candidate query similarity measure for $CQ_1$ may be determined to be 0.307, as illustrated at position C8 in FIG. 4B. As another example, the candidate query suggestion $CQ_2$ has two matching entities $E_1$ and $E_4$. Based on the entries at positions C8 and F8 respectively in FIG. 4A, the candidate query similarity measure for $CQ_2$ may be determined to be 0.367+ 0.307=0.674, as illustrated at position D8 in FIG. 4B. Column 8 in FIG. 4B illustrates example values for the candidate query similarity measures for the other candidate queries based on such determination.

In some implementations the ranking scores associated with the candidate query suggestions may be adjusted based on the candidate query similarity measures. For example, the adjusted ranking scores for the candidate query suggestions may be determined by taking the sum of the ranking score R and the candidate query similarity measure $S_1$, as illustrated by the entries in Column 9 in FIG. 4B. The adjusted ranking for $CQ_1$ may be determined as the sum of the entries at positions C2 and C7, 15+0.066=15.066, as shown by the entry at position C9. Based on such adjusted ranking scores, the top four candidate query suggestions may be identified as $CQ_1$, $CO_2$, $CQ_{49}$, and $CQ_{50}$. Other mathematical combinations of ranking scores and candidate query similarity measures may be utilized, including the product, a weighted average, and so forth.

In some implementations the candidate query similarity measures may be boosted, and the adjusted ranking may be based on the boosted candidate query similarity measures. For example, based on the candidate query similarity measures $S_2$ illustrated by the entries in Column 8 of FIG. 4B, the ranking system 150 may identify candidate query suggestions $CQ_{49}$ and $CQ_{50}$ as the two candidate query suggestions with the highest candidate query similarity measures 0.764 (at position F8 in FIG. 4B) and 0.907 (at position G8 in FIG. 4B), respectively. The ranking system 150 may apply a boost transformation (e.g., as represented by the formula at position B10) in FIG. 4B, to these two identified candidate query similarity measures to obtain values 8.05 (at position F10 in FIG. 4B) and 20.99 (at position G10 in FIG. 4B), respectively. The adjusted ranking score for $CQ_{49}$ may be determined as the sum of the entries at positions F2 and F10, 2+8.05=10.05, as shown by the entry at position F11. Likewise, the adjusted ranking score for $CQ_{50}$ may be determined as the sum of the entries at positions G2 and G10, 1.5+20.99=22.49, as shown by the entry at position G11. In some implementations the adjusted rankings for candidate query suggestions $CQ_{49}$ and $CQ_{50}$ may be compared to the existing ranking scores for the remaining candidate query suggestions in Column 2 in FIG. 4B. Accordingly, the top four candidate query suggestions may be identified as $CQ_{50}$, $CQ_1$, $CQ_2$, and $CQ_{49}$, in the order of decreasing ranking. The ranking system 150 may optionally apply the boost transformation to each candidate query similarity measure (e.g., $S_2$) to obtain values illustrated in Column 10 of FIG. 4B. The ranking system 150 may determine adjusted ranking scores for all the candidate query suggestions as illustrated in Column 11 of FIG. 4B. Accordingly, the top four candidate query suggestions may be identified as $CQ_{50}$, $CQ_2$, $CQ_1$, and $CQ_{49}$, in the order of decreasing ranking.

Referring now to FIGS. 5A-C, tables illustrate examples of entity collections and entity scores for three separate queries. FIG. 5A illustrates a table of example entity collections for a past query of "perseus" and, for each of the entity collections, an entity score that is indicative of the ranking for one or more entities associated with the past query of "perseus" for the entity collection. For example, for the entity collection of "figures", the entity score for the one or more entities associated with the past query of "perseus" is "0.4212". The entities may include, for example, the entity associated with the Greek mythological character and/or the entity associated with the galaxy. As described herein, the ranking of an entity for an entity collection is indicative of the strength of association of that entity with the entity collection. In FIGS. 5A-C, a higher entity score is indicative of a higher strength of association of the one or more entities with the entity collection.

FIG. 5B illustrates a table of example entity collections for a candidate query of "andromeda" and, for each of the entity collections, an entity score that is indicative of the ranking for one or more entities associated with the candidate query of "andromeda" for the entity collection. For example, for the entity collection of "figures", the entity score for the one or more entities associated with the candidate query of "andromeda" is "0.3320". The entity collections highlighted in bold in FIG. 5B indicate those entity collections that match the entity collections of the past query of "perseus" of FIG. 5A.

FIG. 5C illustrates a table of example entity collections for a candidate query of "ann taylor" and, for each of the entity collections, an entity score that is indicative of the ranking for one or more entities associated with the candidate query of "ann taylor" for the entity collection. For example, for the entity collection of "names", the entity score for the one or more entities associated with the candidate query of "ann taylor" is "0.7831". The entity collection highlighted in bold in FIG. 5C indicate the entity collection that matches an entity collection of the past query of "perseus" of FIG. 5A.

With reference to FIGS. 5A and 5B, examples are provided of determining a candidate query similarity measure for the candidate query of "andromeda" based on a single past query of "perseus". As discussed herein, in some implementations the candidate query similarity measure for the candidate query suggestion may be determined as [(number of current entities that match the past entities)/(total number of current entities)]*[(number of past entities that match the current entities)/(total number of past entities)]. Thus, the candidate query similarity measure for the candidate query of "andromeda" may be 0.45 [(6/10)*(6/8)]. In some implementations the candidate query similarity measure may be determined as [(sum of the entity scores of current entities that match the past entities)/(sum of the entity scores of all current entities)]*[(sum of the entity scores of past entities that match the current entities)/(sum of the entity scores of all past entities)]. Thus, the candidate query similarity measure for the candidate query of "andromeda" may be 0.519 [(4.0707/6.5856)*(3.819/4.5443)].

With reference to FIGS. 5A and 5B, examples are provided of determining a candidate query similarity measure for the candidate query of "ann taylor" based on a single past query of "perseus". As discussed herein, in some implementations the candidate query similarity measure for the candidate query suggestion may be determined as [(number of current entities that match the past entities)/(total number of current entities)]*[(number of past entities that match the current entities)/(total number of past entities)]. Thus, the candidate query similarity measure for the candidate query of "ann taylor" may be 0.15 [(6/10)*(1/4)]. In some implementations the candidate query similarity measure may be determined as [(sum of the entity scores of current entities that match the past entities)/(sum of the entity scores of all current entities)]*[(sum of the entity scores of past entities that match the current entities)/(sum of the entity scores of all past entities)]. Thus, the candidate query similarity measure for the candidate query of "andromeda" may be 0.121 [(4.0707/6.5856)*(0.7831/3.989)].

Accordingly, based on the examples provided above, the candidate query similarity measure for the candidate query "andromeda" is more indicative of similarity to the past query "perseus" than the candidate query similarity measure for the candidate query "ann taylor". The candidate query similarity measures may be utilized to promote the candidate query "andromeda" and/or demote the candidate query "ann taylor" utilizing, for example, one or more techniques such as those described herein.

While the search system 160 and the client device 110 are shown as two separate devices, in some implementations the search system 160 and the client device 110 may be the same device. For example, in some implementations a user may install a desktop search application on the client device 110. The search system 160 may be implemented as, for example, computer programs running on one or more computers in one or more locations that are coupled to each other through a network.

Likewise, while the ranking system 150 has been shown to be a separate component, in some implementations the ranking system 150 may be included in one or more of the query session identification system 130 and the query suggestion system 140. In some implementations the query session identification system 130 and the query suggestion system 140 may be optionally combined.

Figure 6:
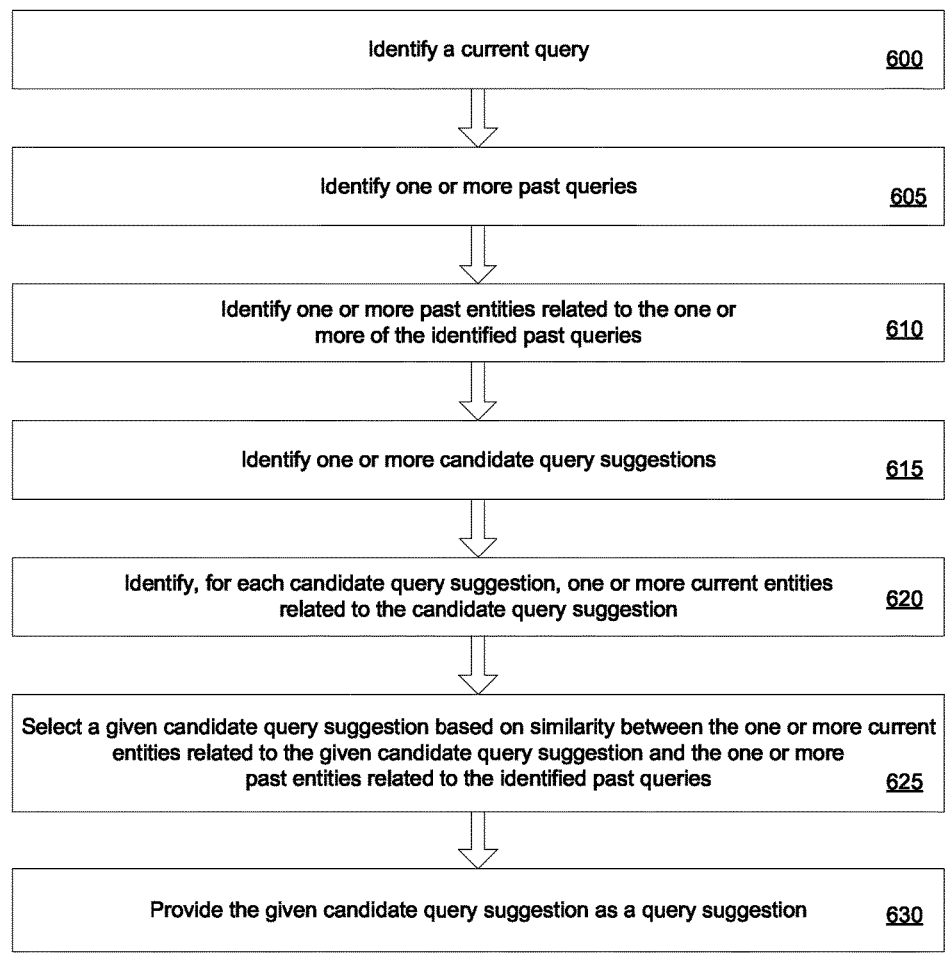
FIG. 6 is a flow chart illustrating an example method of providing one or more query suggestions to a user in response to a current query.

Referring to FIG. 6, a flow chart illustrates an example method of providing one or more query suggestions to a user in response to a current query. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, the query session identification system 130, the query suggestion system 140, the ranking system 150, and/or the search system 160 of FIG. 1.

At step 600, a current query may be identified. In some implementation the current query may be a current query of a user. In some implementations the current query may be a partial query. For example, a user may formulate a query such as "Lu" on a web browser 115.

At step 605, one or more past queries may be identified. In some implementations the past queries may be past queries of a user that submitted the current query of step 600. In some implementations the number of past queries identified may be limited to a fixed number of past queries. For example, the query session identification system 130 may only access the past N queries submitted by a user. In some implementations the number of past queries identified may be limited to a fixed passage of time. For example, the query session identification system 130 may only access the past queries that were submitted by a user within the last half hour.

At step 610, one or more past entities related to the one or more of the identified past queries may be identified. For example, the past queries "rivers", "rivers in Africa", and "Zambezi river" may correspond to past entities that may be associated with the categories "rivers", and "rivers in Africa"; the entities that may be associated with the rivers "Zambezi river", "Kafue River", "Luapula River", "Luangwa River", and "Kalambo River"; the entity that may be associated with the continent "Africa"; the entity that may be associated with the country "Zambia"; and/or the entity that may be associated with the National Park "South Luangwa National Park", among others. In some implementations the identified one or more past entities related to the one or more of the identified past queries may include, or be restricted to, entity collections.

In some implementations one or more aspects of the information about the entity may be obtained from the entity database 120 by the query session identification system 130. For example, in some implementations the entity database 120 may associate each past query with one or more entities related to the past query.

At step 615, one or more candidate query suggestions may be identified that are responsive to the current query of step 600. For example, when the user enters one or more characters at step 600, the query suggestion system 140 may identify candidate query suggestions that are selected using the one or more characters. For example, having entered past queries including "rivers", "rivers in Africa", and "Zambezi river", the user may be interested in learning more about Luapula River and may formulate a partial query "lu" at step 600. In some implementations the query suggestion system 140 may identify "Luapula River", "lululemon", "luke bryan", "lumosity", and "Luangwa River" as candidate query suggestions. In some implementations the candidate query suggestions that are identified may include words or phrases that include the one or more characters that were entered by the user and/or words or phrases that are similar to (e.g., synonyms or spelling corrections of) the user input. In some implementations the candidate query suggestions may include those determined based on a list of past user queries and/or automatically generated queries. In some implementations the identified candidate query suggestions may be based on additional and/or alternative factors such as an identifier of the user who submitted the current query and/or a categorization of the user who submitted the current query.

At step 620, for each candidate query suggestion, one or more current entities related to the candidate query suggestion may be identified. In some implementations the entity database 120 may contain a mapping of one or more candidate query suggestions that each have one or more current entities that may be associated therewith and the query suggestion system 140 may identify current entities from such a mapping.

For example, the candidate query suggestion "Luapula River" may be related to current entities including the entity that may be associated with the continent "Africa"; the entity that may be associated with the continent "Zambia"; the entities that may be associated with the geographical areas "Congo", "Bangweulu Swamps", and "Luapula Province"; and so forth. As another example, the current entities that may be related to the candidate query suggestion "lululemon" may include entities related to yoga attire. In some implementations the current entities identified for each candidate query suggestion may include, or be restricted to, entity collections.

At step 625, a given candidate query suggestion may be selected based on similarity between the one or more current entities related to the given candidate query suggestion and the one or more past entities that may be related to the identified past queries. In some implementations the query suggestion system 140 may determine a candidate query similarity measure for a given candidate query suggestion of the candidate query suggestions based on similarity between the one or more current entities related to the given candidate query suggestion and the one or more past entities that may be related to the identified past queries. A higher candidate query similarity measure may be more indicative of similarity between a past query and the given candidate query suggestion. Determination of such similarity may be based on one or more techniques described herein.

In some implementations the candidate query similarity measure may be indicative of whether or not the given candidate query suggestion has one or more matching entities in common with the past entities. In some implementations the candidate query suggestions may be ranked based on the candidate query similarity measures. In some implementations one or more of the candidate query suggestions may also be ranked based on one or more factors that are distinct from the candidate query similarity measure based on matching entities as described herein.

At step 630, the given candidate query suggestion may be provided as a query suggestion. For example, the query suggestions "luapula river", "luangwa river", luapula", and "luapula foundation" may be provided via a drop-down menu from the search box where the partial query is formulated. In some implementations the user may interact with (e.g., tap, click, or otherwise affirmatively select) one of the provided query suggestions to select the query suggestion.

Figure 7:
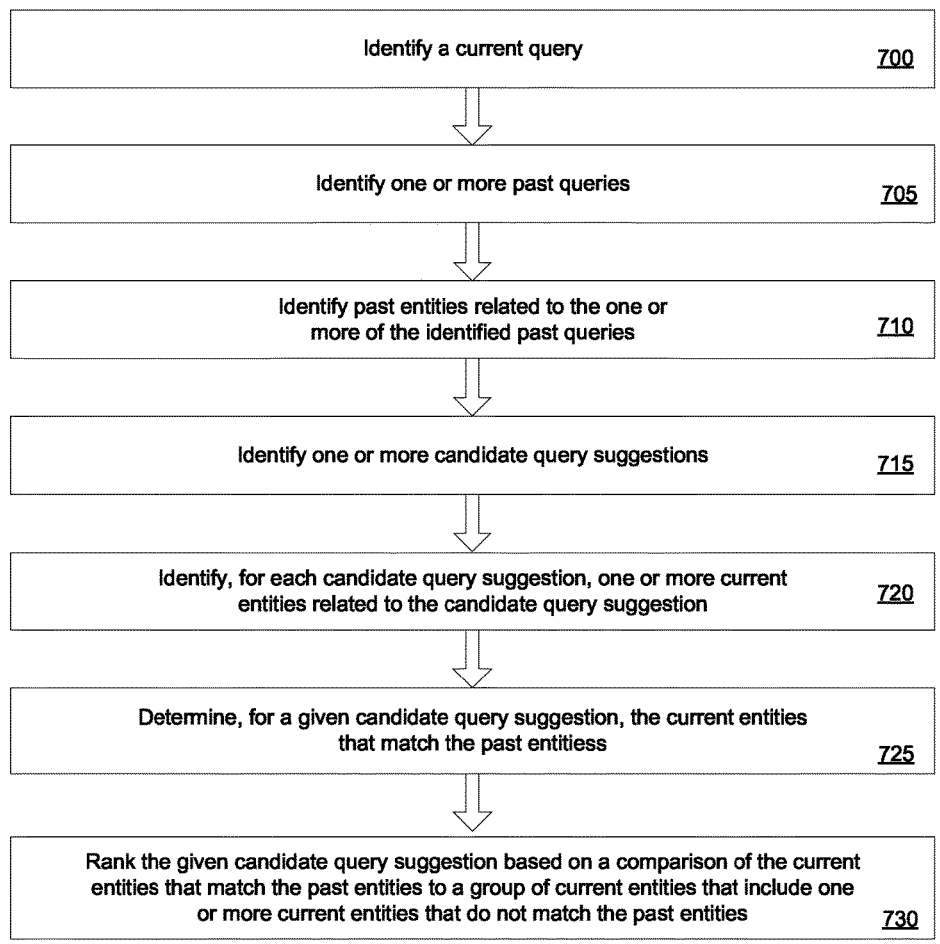
FIG. 7 is a flow chart illustrating another example method of providing one or more query suggestions to a user in response to a current query.

Referring to FIG. 7, a flow chart illustrates another example method of providing one or more query suggestions to a user in response to a current query. Other implementations may perform the steps in a different order, omit certain steps, and/or perform different and/or additional steps than those illustrated in FIG. 7. For convenience, aspects of FIG. 7 will be described with reference to a system of one or more computers that perform the process. The system may include, for example, the query session identification system 130, the query suggestion system 140, the ranking system 150, and/or the search system 160 of FIG. 1.

At step 700, a current query may be identified. In some implementations the current query may be a partial query entered by a user. Step 700 may share one or more aspects in common with step 600 of FIG. 6.

At step 705, one or more past queries may be identified. In some implementations the number of past queries identified may be limited to a fixed number of past queries and/or a fixed passage of time. For example, the query session identification system 130 may only identify the past query of a user that immediately preceded the current query identified at step 700. Step 705 may share one or more aspects in common with step 605 of FIG. 6.

At step 710, one or more past entities related to the one or more of the identified past queries may be identified. In some implementations the past entities identified at step 710 may include, or be restricted to, entity collections. For example, the query session identification system 130 may identify the entity collections directly such as, for example, via a mapping of queries to entity collections associated with the queries. In some implementations the query session identification system 130 may initially determine one or more entities related to the past queries that are not entity collections. For example, the query session identification system 130 may identify one or more dominant entities that are not entity collections and/or one or more entities that are not entity collections and that have a ranking that satisfies a threshold. The query session identification system 130 may then identify one or more entity collections to which the entities belong.

As one example, for a query "zeus", the query session identification system 130 may determine that the entity related to the Greek mythological character Zeus is the dominant entity based on a query to entity mapping in entity database 120. The query suggestion system 140 may then determine entity collections to which the entity related to Greek mythological character Zeus belongs and associate those entity collections with the query "zeus". For example, the query suggestion system 140 may determine the entity collections to which Zeus belongs based on a mapping between the entity related to the Greek mythological character Zeus and entity collections such as "heroes", "fictional characters", "names", etc. Step 710 may share one or more aspects in common with step 610 of FIG. 6.

At step 715, one or more candidate query suggestions may be identified that are responsive to the current query of step 700. For example, when a user enters one or more characters at step 700, the query suggestion system 140 may identify candidate query suggestions that are selected using the one or more characters. Step 715 may share one or more aspects in common with step 615 of FIG. 6.

At step 720, for each candidate query suggestion, one or more current entities related to the candidate query suggestion may be identified. In some implementations the entity database 120 may contain a mapping of one or more candidate query suggestions that each have one or more current entities that may be associated therewith and the query suggestion system 140 may identify current entities from such a mapping.

In some implementations the past entities identified at step 720 may include, or be restricted to, entity collections. For example, the query suggestion system 140 may identify the entity collections directly such as, for example, via a mapping of queries to entity collections associated with the queries. In some implementations the query suggestion system 140 may initially determine one or more entities related to the past queries that are not entity collections. For example, the query suggestion system 140 may identify one or more dominant entities that are not entity collections and/or one or more entities that are not entity collections and that have a ranking that satisfies a threshold. The query suggestion system 140 may then identify one or more entity collections to which the entities belong. Step 720 may share one or more aspects in common with step 620 of FIG. 6.

At step 725, the current entities that match the past entities are determined for a given candidate query suggestion of the candidate query suggestions identified at step 720. For example, the query suggestion system 140 and/or the ranking system 150 may determine which current entities of the given candidate query suggestion match the past entities.

At step 730, the given candidate query suggestion is ranked based on a comparison of the current entities that match the past entities to a group of current entities that include one or more current entities that do not match the past entities. For example, the query suggestion system 140 and/or the ranking system 150 may determine a candidate query similarity measure for the given candidate query suggestion based on a comparison of the current entities that match the past entities to a group of current entities that include one or more current entities that do not match the past entities. The candidate query similarity measure may be utilized, in whole or in part, to rank the given candidate query suggestion. For example, in some implementations the candidate query similarity measure may be utilized to modify a ranking of the given candidate query suggestion, such as a ranking determined based on traditional or other query suggestion ranking techniques.

In some implementations the group of the current entities that includes current entities that do not match the past entities includes all identified of the current entities. In some implementations the group of the current entities that include current entities that do not match the past entities includes only the identified current entities that do not match the past entities. In some implementations the candidate query similarity measure may be based on one or more equations that compare the number of current entities that match the past entities to a group of the current entities that includes current entities that do not match the past entities, such as:

Candidate Query Similarity Measure=[(number of current entities that match the past entities)/ (number of current entities that do not match the past entities)];

Candidate Query Similarity Measure=[(number of current entities that match the past entities)/ (total number of current entities)];

In some implementations the candidate query similarity measure may additionally and/or alternatively be based on a comparison of: (1) the number of past entities related to the identified past queries that match the current entities related to the given candidate query suggestion to (2) a group of the past entities that includes past entities that do not match the current entities. For example, the candidate query similarity measure for the given candidate query suggestion may be determined as [(number of current entities that match the past entities)/(total number of current entities)]*[(number of past entities that match the current entities)/(total number of past entities)].

In some implementations it is determined, based on the ranking determined at step 730, whether to provide the given candidate query suggestion as a query suggestion for the current query identified at step 700. For example, if the ranking satisfies a threshold, such as a threshold based on the ranking of other candidate query suggestions, the given candidate query suggestion may be provided as a query suggestion. In some implementations the query suggestion may be provided via a drop-down menu from a search box where the current query identified at step 700 is formulated. In some implementations the user may interact with (e.g., tap, click, or otherwise affirmatively select) the provided query suggestion to select the query suggestion.

Figure 8:
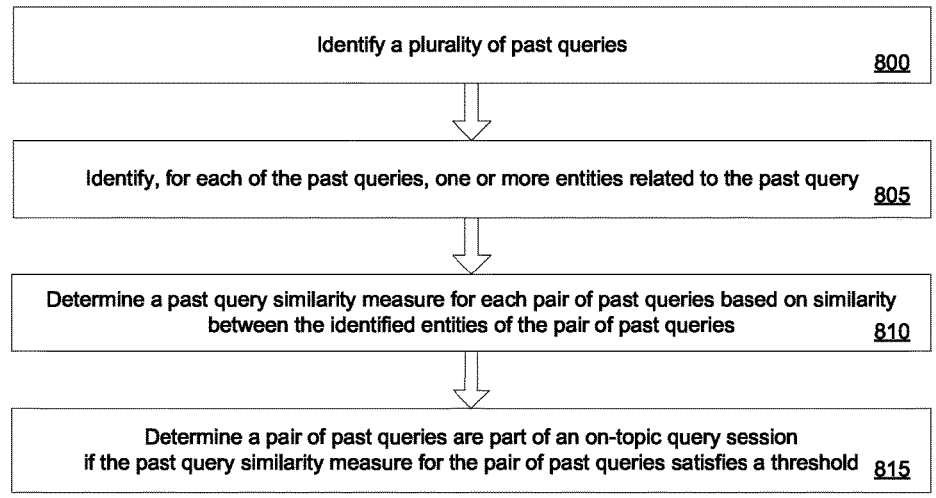
FIG. 8 is a flow chart illustrating an example method of identifying an on-topic query session.

Referring to FIG. 8, a flow chart illustrates an example method of identifying an on-topic query session. Other implementations may perform the steps in a different order, omit certain steps, and/or perform different and/or additional steps than those illustrated in FIG. 8. For convenience, aspects of FIG. 8 will be described with reference to a system of one or more computers that perform the process. The system may include, for example, the query session identification system 130, the query suggestion system 140, the ranking system 150, and/or the search system 170 of FIG. 1.

At step 800, a plurality of past queries of a user may be identified. In some implementations the number of past queries identified may be limited to a fixed number of past queries and/or may be limited to a fixed passage of time. For example, the query session identification system 130 may only access the past queries that were submitted within the last half hour. Step 800 may share one or more aspects in common with step 605 of FIG. 6 and/or step 705 of FIG. 7.

At step 805, for each of the past queries, one or more entities related to the past query may be identified. In some implementations, the query session identification system 130 may identify one or more past entities that may be related to a past query based on the search results and/or search result documents generated in response to a submitted query. In some implementations the entity database 120 may include an index of queries and associated entities and the query session identification system 130 may identify the entities from the index. For example, for each query, a mapping (e.g., data defining an association) between the query and one or more entities related with the query may be identified in the entity database 120. In some implementations one or more entities that may be related to a received query may be identified from such a mapping. In some implementations the identified entities may include, or be restricted to, entity collections.

At step 810, a past query similarity measure between a pair of past queries $Q_1$ and $Q_2$ may be determined based on the number of shared entities (e.g., entities that are common to both the past queries $Q_1$ and $Q_2$) between the past entities of $Q_1$ and $Q_2$. A higher number of shared entities between the past entities of $Q_1$ and $Q_2$ may be more indicative of similarity between the past queries $Q_1$ and $Q_2$ than a lower number of shared entities between the past entities of $Q_1$ and $Q_2$. For example, the first past query $Q_1$ may be related to past entities $E_{11}$, $E_{12}$, and $E_{13}$, with entity scores $S_{11}$, $S_{12}$, and $S_{13}$, respectively. The second past query $Q_2$ may be related to past entities $E_{21}$, $E_{22}$, $E_{23}$, and $E_{24}$, with entity scores $S_{21}$, $S_{22}$, $S_{23}$, and $S_{24}$, respectively. In a first scenario, entities $E_{12}$ and $E_{13}$ related to the past query $Q_1$ may be the same as entities $E_{23}$ and $E_{24}$ related to the past query $Q_2$. In a second scenario, entity $E_{12}$ related to the past query $Q_1$ may be the same as entity $E_{23}$ related to the past query $Q_2$. Accordingly, a past query similarity measure more indicative of similarity may be associated with $Q_1$ and $Q_2$ in the first scenario than in the second scenario.

At step 815, a pair of past queries may be determined to be a part of an on-topic query session if the past query similarity measure satisfies a threshold. An on-topic query session is a plurality of queries that may be related to one or more similar topics. Past queries may be identified as part of an on-topic query session if the past query similarity measure satisfies a threshold. For example, the past query similarity measure may be a score from 0 to 1 and the threshold for the past query similarity measure may be 0.85. A pair of past queries that have a past query similarity measure more than 0.85 may be identified as part of an on-topic query session. For example, past queries "rivers in africa" and "Zambezi river" may be associated with a past query similarity measure 0.92, based at least in part on comparison of the past entities related to the past queries. Having satisfied the threshold of 0.85, these past queries may be identified as part of an on-topic query session.

Figure 9:
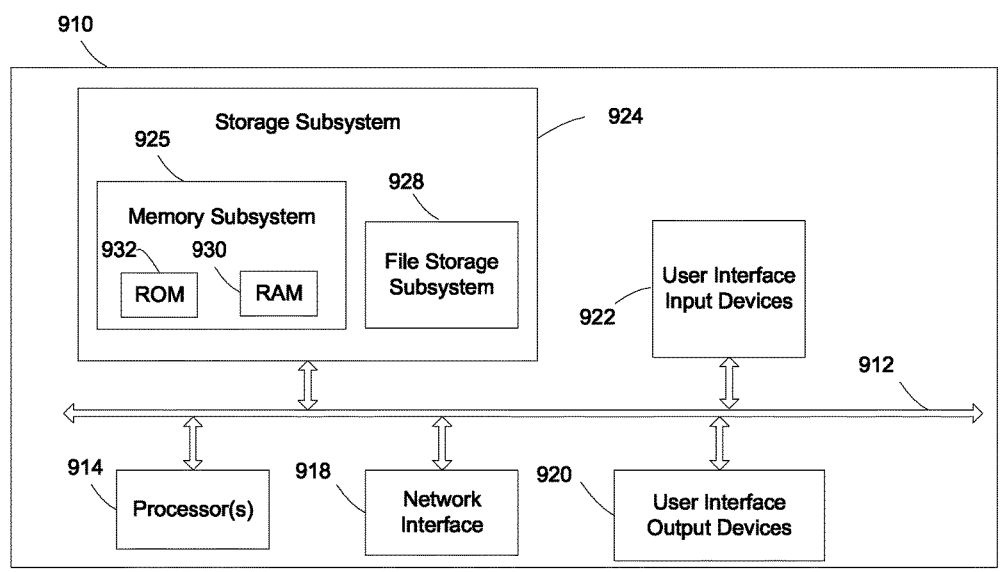
FIG. 9 illustrates an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 925 and a file storage subsystem 926, user interface input devices 922, user interface output devices 920, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to associate a query with at least one entity; provide one or more search results for a query; identify query suggestions for a query; determine entities associated with one or more past queries and/or candidate query suggestions; rank a candidate query suggestion based on entities of the current query suggestion that match entities of one or more past query suggestions; and/or provide one or more candidate query suggestions in response to a query.

These software modules are generally executed by processor 914 alone or in combination with other processors. Memory 925 used in the storage subsystem may include a number of memories including a main random access memory (RAM) 930 for storage of instructions and data during program execution and a read only memory (ROM) 932 in which fixed instructions are stored. A file storage subsystem 924 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 924 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 may be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method, comprising:
  identifying one or more past queries submitted by a user via a user interface input device of a computing device of the user;
  identifying a first group of one or more entity collections related to one or more of the past queries submitted by the user, wherein each of the entity collections of the first group include a grouping of entities that are members of the entity collection and that share one or more aspects in common;
  identifying a current query inputted by the user, the current query inputted via the computing device following the one or more past queries;
  identifying one or more candidate suggestions for the current query;
  determining, for a given candidate suggestion of the candidate suggestions, that an entity collection of the entity collections of the first group is related to one or more of the past queries submitted by the user and is also related to the given candidate suggestion, wherein the given candidate suggestion is in addition to the one or more past queries submitted by the user;

based on determining that input of the current query by the user satisfies one or more positional or temporal criteria relative to the one or more past queries submitted by the user:

ranking the given candidate query suggestion relative to other of the candidate suggestions based on determining that the entity collection is related to both:
one or more of the past queries submitted by the user, and
the given candidate query suggestion; and causing, based on the ranking, the given candidate query suggestion to be displayed to the user in response to the current query, the display of the given candidate query suggestion being via a user interface output device of the computing device.

2. The method of claim 1, wherein the criteria include that the current query is the first query inputted via the computing device following the one or more past queries.

3. The method of claim 2, wherein the criteria include that the current query is inputted within a threshold amount of time following the one or more past queries.

4. The method of claim 1, wherein the criteria include that the current query is inputted within a threshold amount of time following the one or more past queries.

5. The method of claim 1, further comprising:
determining an overall popularity measure for the entity collection;
wherein ranking the given candidate suggestion relative to other of the candidate suggestions is further based on the overall popularity measure for the entity collection.

6. The method of claim 1, further comprising:
determining, based on the ranking, whether to provide the given candidate suggestion as a query suggestion for the current query.

7. The method of claim 1, further comprising:
determining, based on the ranking, a presentation order of the given candidate suggestion in providing the given candidate suggestion as a query suggestion for the current query.

8. A system comprising:
memory storing instructions;
one or more processors operable to execute the instructions stored in the memory to:
identify one or more past queries submitted by a user via a user interface input device of a computing device of the user;
identify a first group of one or more entity collections related to one or more of the past queries submitted by the user, wherein each of the entity collections of the first group include a grouping of entities that are members of the entity collection and that share one or more aspects in common;
identify a current query inputted by the user, the current query inputted via the computing device following the one or more past queries;
identify one or more candidate suggestions for the current query;
determine, for a given candidate suggestion of the candidate suggestions, that an entity collection of the entity collections of the first group is related to one or more of the past queries submitted by the user and is also related to the given candidate suggestion,
wherein the given candidate suggestion is in addition to the one or more past queries submitted by the user;

based on determining that input of the current query by the user satisfies one or more positional or temporal criteria relative to the one or more past queries submitted by the user:
rank the given candidate query suggestion relative to other of the candidate suggestions based on determining that the entity collection is related to both:
one or more of the past queries submitted by the user, and
the given candidate query suggestion; and
cause, based on the ranking, the given candidate query suggestion to be displayed to the user in response to the current query, the display of the given candidate query suggestion being via a user interface output device of the computing device.

9. The system of claim 8, wherein the criteria include that the current query is the first query inputted via the computing device following the one or more past queries.

10. The system of claim 9, wherein the criteria include that the current query is inputted within a threshold amount of time following the one or more past queries.

11. The system of claim 8, wherein the criteria include that the current query is inputted within a threshold amount of time following the one or more past queries.

12. The system of claim 8, wherein in executing the instructions stored in the memory the processors are further to:
determine an overall popularity measure for the entity collection;
wherein ranking the given candidate suggestion relative to other of the candidate suggestions is further based on the overall popularity measure for the entity collection.

13. The system of claim 8, wherein in executing the instructions stored in the memory the processors are further to:
determine, based on the ranking, whether to provide the given candidate suggestion as a query suggestion for the current query.

14. The system of claim 8, wherein in executing the instructions stored in the memory the processors are further to:
determine, based on the ranking, a presentation order of the given candidate suggestion in providing the given candidate suggestion as a query suggestion for the current query.

15. A non-transitory computer readable storage medium storing computing device instructions executable by a processor to perform a method comprising:
identifying one or more past queries submitted by a user via a user interface input device of a computing device of the user;
identifying a first group of one or more entity collections related to one or more of the past queries submitted by the user, wherein each of the entity collections of the first group include a grouping of entities that are members of the entity collection and that share one or more aspects in common;
identifying a current query inputted by the user, the current query inputted via the computing device following the one or more past queries;
identifying one or more candidate suggestions for the current query;
determining, for a given candidate suggestion of the candidate suggestions, that an entity collection of the entity collections of the first group is related to one or more of the past queries submitted by the user and is also related to the given candidate suggestion, wherein the given candidate suggestion is in addition to the one or more past queries submitted by the user;

based on determining that input of the current query by the user satisfies one or more positional or temporal criteria relative to the one or more past queries submitted by the user:

ranking the given candidate query suggestion relative to other of the candidate suggestions based on determining that the entity collection is related to both:
one or more of the past queries submitted by the user, and
the given candidate query suggestion; and causing, based on the ranking, the given candidate query suggestion to be displayed to the user in response to the current query, the display of the given candidate query suggestion being via a user interface output device of the computing device.

* * * * *